US012478992B2

(12) United States Patent
Kimura et al.

(10) Patent No.: US 12,478,992 B2
(45) Date of Patent: Nov. 25, 2025

(54) SPRAY DEVICE, SPRAY METHOD, AND MIST SPACE STAGING SYSTEM

(71) Applicant: Panasonic Intellectual Property Management Co., Ltd., Osaka (JP)

(72) Inventors: Kota Kimura, Saitama (JP); Yosuke Kobayashi, Saitama (JP); Takeshi Ogata, Tokyo (JP); Osamu Ogawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 693 days.

(21) Appl. No.: 17/755,586

(22) PCT Filed: Mar. 2, 2021

(86) PCT No.: PCT/JP2021/007975
§ 371 (c)(1),
(2) Date: May 2, 2022

(87) PCT Pub. No.: WO2021/177310
PCT Pub. Date: Sep. 10, 2021

(65) Prior Publication Data

US 2022/0379326 A1 Dec. 1, 2022

(30) Foreign Application Priority Data

Mar. 4, 2020 (JP) ................................ 2020-037059
Mar. 4, 2020 (JP) ................................ 2020-037060

(51) Int. Cl.
*B05B 7/12* (2006.01)
*B05B 7/06* (2006.01)

(52) U.S. Cl.
CPC ................ *B05B 7/12* (2013.01); *B05B 7/066* (2013.01)

(58) Field of Classification Search
CPC ................................ B05B 7/12; B05B 7/066
(Continued)

(56) References Cited

U.S. PATENT DOCUMENTS 9,421,559 B2 * 8/2016 Cornett .................. B05B 1/202
2007/0075163 A1 * 4/2007 Smith .................. B05B 9/0423 137/563

(Continued)

FOREIGN PATENT DOCUMENTS

CN 1930666 3/2007
CN 102253583 A 11/2011

(Continued)

OTHER PUBLICATIONS

JP2017154091 English by Google Patents (Year: 2017).*

(Continued)

*Primary Examiner* — Chee-Chong Lee
(74) *Attorney, Agent, or Firm* — Wenderoth, Lind & Ponack, L.L.P.

(57) ABSTRACT

A spray device (A) according to the present disclosure includes: a two-fluid nozzle (11) which sprays a mist (91); a spray-device-side gas flow path (12) for supplying a gas to the two-fluid nozzle (11); a gas supply source (17) which supplies the gas to the spray-device-side gas flow path (12); a spray-device-side liquid flow path (13) for supplying a liquid to the two-fluid nozzle (11); a liquid supply source (18) which supplies the liquid to the spray-device-side liquid flow path (13); a pulse-driven liquid flow control valve (14) having a valve opening degree that is adjusted according to a pulse signal to control the flow rate of the liquid in the spray-device-side liquid flow path (13); and a controller (30) which adjusts, in multiple levels, the concentration of the mist (91) sprayed from the two-fluid nozzle 11 by adjusting the valve opening degree of the liquid flow control valve 14.

13 Claims, 11 Drawing Sheets

(58) Field of Classification Search
USPC ............................................................ 239/8
See application file for complete search history.

(56) References Cited

U.S. PATENT DOCUMENTS

| | | | | |
|---|---|---|---|---|
| 2007/0141849 | A1 | 6/2007 | Kanno et al. | |
| 2008/0178819 | A1* | 7/2008 | Sia | A01K 39/04 119/300 |
| 2013/0153676 | A1* | 6/2013 | Ballu | A01C 23/047 239/11 |
| 2014/0239086 | A1 | 8/2014 | Wong | |
| 2014/0320824 | A1 | 10/2014 | Kim et al. | |
| 2020/0171526 | A1 | 6/2020 | Morizono | |
| 2020/0406281 | A1* | 12/2020 | Funseth | B05B 1/1645 |

FOREIGN PATENT DOCUMENTS

| | | | |
|---|---|---|---|
| CN | 105377448 | | 3/2016 |
| CN | 109925733 | | 6/2019 |
| JP | 7-292745 | | 11/1995 |
| JP | 11-051823 | | 2/1999 |
| JP | 2005-279562 | | 10/2005 |
| JP | 2007-139403 | A | 6/2007 |
| JP | 2007-144396 | A | 6/2007 |
| JP | 2008-161834 | A | 7/2008 |
| JP | 2008-261441 | | 10/2008 |
| JP | 2015-179130 | | 10/2015 |
| JP | 2017-154091 | | 9/2017 |
| JP | 2017-176975 | | 10/2017 |
| JP | 2018-015738 | | 2/2018 |
| KR | 10-2008-109534 | A | 12/2008 |
| WO | 2018/115581 | A1 | 6/2018 |
| WO | 2018/179474 | | 10/2018 |

OTHER PUBLICATIONS

International Search Report of PCT application No. PCT/JP2021/007975 dated May 11, 2021.
English Translation of Office Action issued May 30, 2024 in Chinese Patent Application No. 202180006924.0.
Singaporean OA dated Apr. 10, 2025 for related Singaporean Patent Application No. 11202250805H, 8 pages.

* cited by examiner

SPRAY DEVICE, SPRAY METHOD, AND MIST SPACE STAGING SYSTEM

TECHNICAL FIELD

The present disclosure relates to a spray device and a spray method for spraying mist, obtained by mixing liquid and gas and atomizing the liquid, into an indoor space with two-fluid nozzles, and a mist space staging system which mainly includes the spray device. Specifically, the mist space staging system is a mist space staging system capable of adjusting the mist concentration in the mist space in multiple levels by an operation made by a console externally connected to the spray device.

BACKGROUND ART

In recent years, a video projection method which uses mist has been developed, and the availability of such a method in art or entertainment is expanding.

As illustrated in FIG. 8, Patent Literature (PTL) 1 discloses projection device 1 which includes projection unit 2 and screen forming device 3 electrically connected to projection unit 2.

As illustrated in FIG. 9, screen forming device 3 includes generator 301 and ejection portion 303 which communicates with generator 301 via duct 302. Generator 301 includes tank 307 which has one end surface with opening 305 and another end surface that communicates with duct 302. For example, water 308 is stored in tank 307, and ultrasonic transducer 309 is provided in water 308. In order to manage the mist concentration measurement, light emitter 401 and light receiver 402 are provided in each of generator 301 and ejection portion 303. Screen forming device 3 is capable of forming a uniform mist screen and appropriately projecting an image onto the mist screen.

CITATION LIST

Patent Literature

[PTL 1] Japanese Unexamined Patent Application Publication No. 2015-179130

[PTL 2] International Application Publication No. WO2018/179474

SUMMARY OF THE INVENTION

In order to spray mist, which is atomized liquid, into the indoor space and stage a mist space in various forms, it is necessary to adjust the mist concentration in the indoor space to a desired state each time through multilevel adjustment of the spray volume of the mist and in combination with mist and another staging device.

With the configuration disclosed in PTL 1, a mist screen can be formed which has a locally increased mist concentration. However, no consideration has been given to an idea of adjusting the mist concentration in the indoor space in multiple levels, and such a multilevel adjustment is not possible in terms of the structural aspect.

Accordingly, as in PTL 2, a configuration of a spray system which uses two-fluid spray nozzles that mix liquid and gas to produce mist has been proposed. In the configuration, the spray volume is adjusted with a liquid flow control valve capable of adjusting the valve opening degree by pulse control and controlling the supply volume in multiple levels.

However, in the configuration of PTL 2, it may be that the pressure difference between the gas and the liquid supplied to the nozzles exceeds the allowable pressure difference of the liquid flow control valve, and the pressure greater than or equal to the driving torque of the liquid flow control valve is applied to the liquid flow control valve. As a result, the liquid flow control valve may have a malfunction such as opening and closing failure.

The present disclosure is to solve the above-mentioned conventional problems. An object of the present disclosure is to provide a spray device, a spray method, and a mist space staging system capable of adjusting the mist concentration in a mist staging space in multiple levels by spraying mist, which is atomized liquid, into an indoor space with two-fluid nozzles.

A spray device according to the present disclosure includes: a two-fluid nozzle which sprays mist obtained by mixing liquid and gas and atomizing the liquid; a spray-device-side gas flow path for supplying the gas to the two-fluid nozzle; a gas valve which opens and closes the spray-device-side gas flow path; a gas supply source which supplies the gas to the spray-device-side gas flow path; a spray-device-side liquid flow path for supplying the liquid to the two-fluid nozzle; a liquid valve which opens and closes the spray-device-side liquid flow path; and a liquid supply source which supplies the liquid to the spray-device-side liquid flow path. The spray device according to the present disclosure also includes: a liquid flow control valve which is provided in the spray-device-side liquid flow path between the two-fluid nozzle and the liquid valve, is driven by a pulse, and has a valve opening degree that is adjusted according to a pulse signal to control a flow rate of the liquid in the spray-device-side liquid flow path; and a controller which adjusts the valve opening degree of the liquid flow control valve according to the pulse signal from a console externally provided to the spray device. The controller adjusts, in multiple levels, the concentration of the mist sprayed from the two-fluid nozzle by adjusting the valve opening degree of the liquid flow control valve.

A mist space staging system according to the present disclosure includes a spray device and a staging device. The controller adjusts the mist concentration in multiple levels in accordance with an output from the staging device.

A spray method according to the present disclosure includes: supplying gas from a gas supply source to a two-fluid nozzle via a spray-device-side gas flow path which is opened and closed by a gas valve; supplying liquid from a liquid supply source to the two-fluid nozzle via a spray-device-side liquid flow path which is opened and closed by a liquid valve; spraying, from the two-fluid nozzle, mist obtained by mixing the liquid and the gas supplied to the two-fluid nozzle and atomizing the liquid; receiving, by a controller, a pulse signal from a console when the mist is sprayed from the two-fluid nozzle; and adjusting, in multiple levels, a concentration of the mist sprayed from the two-fluid nozzle by adjusting, by the controller, a valve opening degree control pulse of a pulse-driven liquid flow control valve provided in the spray-device-side liquid flow path between the two-fluid nozzle and the liquid valve to control a flow rate of the liquid in the spray-device-side liquid flow path.

According to the present disclosure, the controller adjusts the valve opening degree of the liquid flow control valve to spray mist, which is atomized liquid, into the indoor space with the two-fluid nozzles. Accordingly, the mist concentration in the indoor space can be adjusted in multiple levels. As a result, the mist space can be staged in various forms by adjusting the mist concentration in accordance with the intensity of an output, such as the sound or light flux, from another staging device to be combined with the mist.

A spray method according to the present disclosure includes: supplying gas from a gas supply source to a two-fluid nozzle via a spray-device-side gas flow path; supplying liquid from a liquid supply source to the two-fluid nozzle via a spray-device-side liquid flow path and a pulse-driven liquid flow control valve provided in the spray-device-side liquid flow path; and spraying, from the two-fluid nozzle, mist obtained by mixing the liquid and the gas supplied to the two-fluid nozzle and atomizing the liquid. The spray method according to the present disclosure also includes, when the mist is sprayed from the two-fluid nozzle, (i) closing an on-off valve provided in the spray-device-side liquid flow path between the liquid flow control valve and the liquid pressure gauge when the pressure of liquid detected by a liquid pressure gauge provided in the spray-device-side liquid flow path between the liquid flow control valve and the liquid supply source is greater than the pressure of gas detected by a gas pressure gauge provided in the spray-device-side gas flow path between the two-fluid nozzle and the gas supply source and a pressure difference between the pressure of the liquid and the pressure of the gas is greater than or equal to an allowable pressure difference preset to the liquid flow control valve, and (ii) opening the on-off valve when the pressure difference is less than the allowable pressure difference.

A spray method according to the present disclosure includes: supplying gas from a gas supply source to a two-fluid nozzle via a spray-device-side gas flow path; supplying liquid from a liquid supply source to the two-fluid nozzle via a spray-device-side liquid flow path and a pulse-driven liquid flow control valve provided in the spray-device-side liquid flow path; and spraying, from the two-fluid nozzle, mist obtained by mixing the liquid and the gas supplied to the two-fluid nozzle and atomizing the liquid. The spray method according to the present disclosure includes, when the mist is sprayed from the two-fluid nozzle, (i) discharging the gas from the gas supply source at a pressure less than an allowable pressure, and (ii) causing a pressure reducing valve to reduce a pressure of the liquid discharged from the liquid supply source such that a pressure difference between a pressure of the gas discharged from the gas supply source and the pressure of the liquid discharged from the liquid supply source is less than an allowable pressure difference. The pressure reducing valve is provided in the spray-device-side liquid flow path between the liquid flow control valve and the liquid supply source to reduce the pressure of the liquid discharged from the liquid supply source.

A spray method according to the present disclosure includes: supplying gas from a gas supply source to a two-fluid nozzle via a spray-device-side gas flow path; supplying liquid from a liquid supply source to the two-fluid nozzle via a spray-device-side liquid flow path and a pulse-driven liquid flow control valve provided in the spray-device-side liquid flow path; and spraying, from the two-fluid nozzle, mist obtained by mixing the liquid and the gas supplied to the two-fluid nozzle and atomizing the liquid. The spray method according to the present disclosure also includes, when the mist is sprayed from the two-fluid nozzle, causing a check valve provided in the spray-device-side liquid flow path between the liquid flow control valve and the two-fluid nozzle (i) to allow the liquid to flow from a liquid flow control valve side to a two-fluid nozzle side and (ii) to prevent the liquid to flow from the two-fluid nozzle side to the liquid flow control valve side.

According to the present disclosure, the controller causes the on-off valve to open or close the spray-device-side liquid flow path, or the pressure reducing valve reduces the pressure of the liquid such that the pressure difference between the pressure of the gas discharged from the gas supply source and the pressure of the liquid discharged from the liquid supply source is less than the allowable pressure difference, or the check valve is included which prevents liquid from flowing from a two-fluid nozzle side to a liquid flow control valve side. With such a configuration, the pressure difference between the pressure of the liquid and the pressure of the gas does not become greater than or equal to the allowable pressure difference preset to the liquid flow control valve, and thus, it is possible to reduce the occurrence of malfunctions of the liquid flow control valve.

DESCRIPTION OF EMBODIMENTS

Hereinafter, embodiments of the present disclosure will be described with reference to the drawings.

First Embodiment

Figure 1:
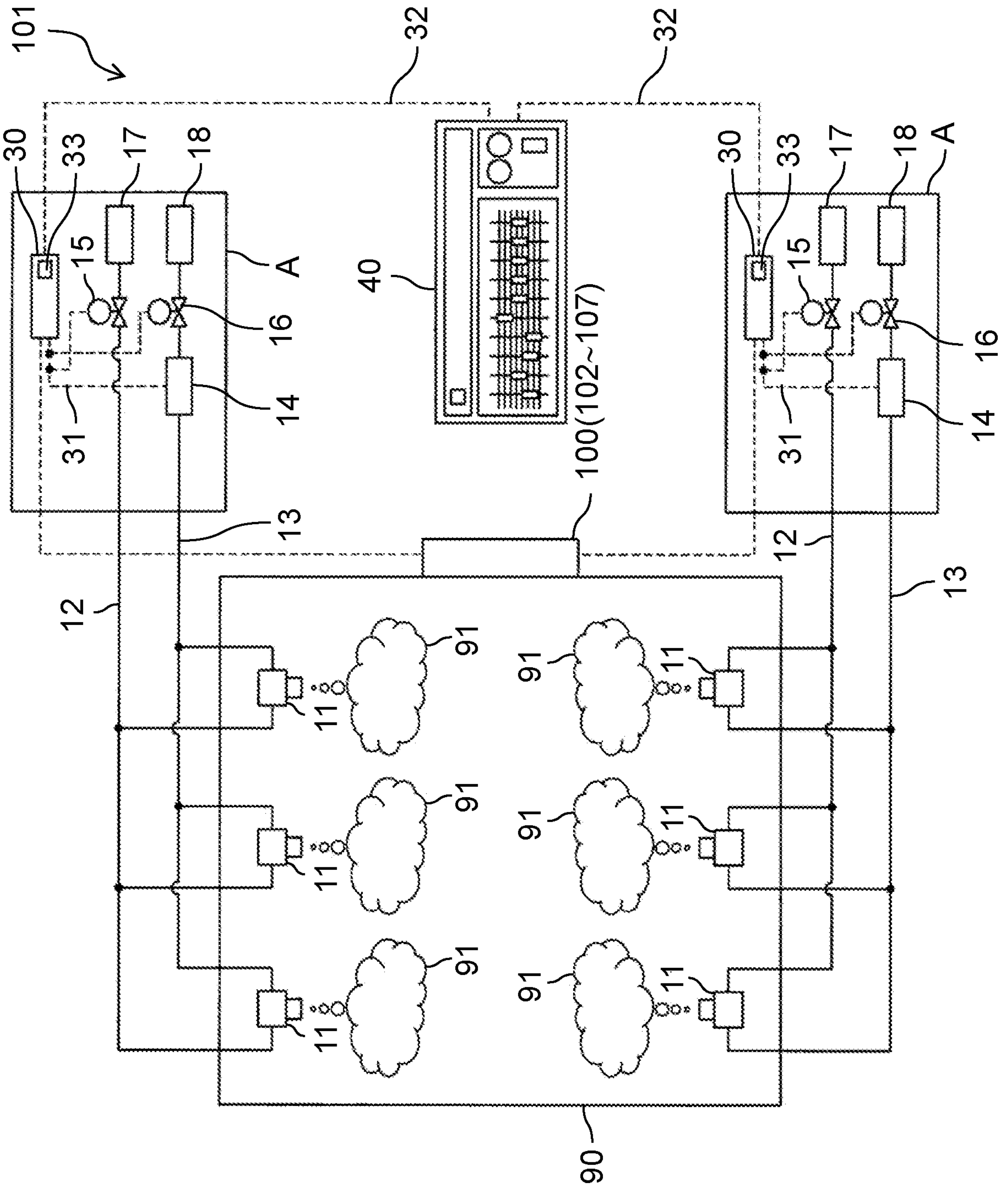
FIG. 1 is a configuration diagram of a mist space staging system which includes spray devices according to the present disclosure.

FIG. 1 is a configuration diagram of mist space staging system 101 according to a first embodiment of the present disclosure which includes spray devices A each of which performs a spray method.

Mist space staging system 101 includes spray devices A and console 40.

In order to spray mist 91, each spray devices A mainly includes two-fluid nozzles 11, spray-device-side gas flow path 12, spray-device-side liquid flow path 13, liquid flow control valve 14, gas valve 15, liquid valve 16, gas supply source 17, liquid supply source 18, and controller 30.

Controller 30 includes external signal input terminal 33 for receiving a pulse signal from console 40 provided externally to spray device A. External signal input terminal 33 of spray device A and console 40 are connected via signal wiring 32.

One or more two-fluid nozzles 11 are provided in indoor space 90. As an example, as illustrated in FIG. 1, a plurality of two-fluid nozzles 11 are provided in indoor space 90. In the present embodiment, three two-fluid nozzles 11 are connected to one spray device A for operation control.

Gas supply source 17 supplies gas to two-fluid nozzles 11 through spray-device-side gas flow path 12. An example of the gas is air.

Liquid supply source 18 supplies liquid to two-fluid nozzles 11 through spray-device-side liquid flow path 13. An example of the liquid is water.

The liquid and gas supplied to two-fluid nozzles 11 are mixed and the liquid is atomized by two-fluid nozzles 11. Mist 91 generated by atomization is sprayed into indoor space 90 from two-fluid nozzles 11.

As each two-fluid nozzle 11, for example, an intermixing type nozzle, to which compressed gas and pressurized liquid are supplied and which mixes the supplied gas and liquid inside the nozzle and atomizes the liquid, is used.

As spray-device-side gas flow path 12 and spray-device-side liquid flow path 13, for example, metal pipes, such as steel pipes or stainless pipes, or resin tubes are used.

As gas supply source 17, for example, a compressor, a pump, or a blower capable of supplying compressed gas having a pressure of 0.1 MPa to 1 MPa is used. Gas supply source 17 may be the one that is capable of supplying gas to spray-device-side gas flow path 12 at a predetermined pressure via a regulator or the like.

As liquid supply source 18, for example, a pump capable of supplying liquid at a pressure of 0.1 to 1 MPa is used. Liquid supply source 18 may be the one that is capable of supplying liquid to spray-device-side liquid flow path 13 at a predetermined pressure via a regulator or the like. Moreover, liquid supply source 18 may be a pressurized tank capable of pressurizing the liquid in the pressure vessel at a predetermined pressure using compressed gas and supplying liquid.

Gas valve 15 is provided in spray-device-side gas flow path 12 between gas supply source 17 and two-fluid nozzles 11. Gas valve 15 is connected to controller 30 via control wiring 31. Gas valve 15 is opened or closed when current is applied or when no current is applied from controller 30, and starts or stops the supply of gas from gas supply source 17 to two-fluid nozzles 11 via spray-device-side gas flow path 12.

Liquid valve 16 is provided in spray-device-side liquid flow path 13 between liquid supply source 18 and liquid flow control valve 14. Liquid valve 16 is connected to controller 30 via control wiring 31. Liquid valve 16 is opened or is closed when current is applied or when no current is applied from controller 30, and starts or stops the supply of liquid from liquid supply source 18 to two-fluid nozzles 11 via spray-device-side liquid flow path 13.

By adding the pressure value of the gas in spray-device-side gas flow path 12 to the control conditions of liquid valve 16, it is possible to prevent dripping from two-fluid nozzles 11 caused due to insufficient gas pressure.

As gas valve 15 and liquid valve 16, for example, two-way solenoid valves are used. Gas valve 15 and liquid valve 16 each may be a normally closed valve in which the valve is closed when no current is applied and the valve is opened when current is applied.

Liquid flow control valve 14 is provided in spray-device-side liquid flow path 13 between liquid valve 16 and two-fluid nozzles 11 on the downstream side. The valve opening degree of liquid flow control valve 14 is adjusted in multiple levels when a pulse motor (not illustrated) connected to liquid flow control valve 14 is driven according to a control signal of the pulse signal from controller 30. Multilevel adjustment of the valve opening degree of liquid flow control valve 14 allows the flow rate of the liquid in spray-device-side liquid flow path 13 to be controlled in multiple levels, so that the spray flow rate of mist 91 can be adjusted in multiple levels. Accordingly, the mist concentration can be adjusted in multiple levels.

In this configuration, the mist spray volume is controlled by keeping the pressure of air, as an example of gas, constant (that is, fixing the air pressure), and by controlling the flow rate of water, as an example of liquid (that is, indirectly adjusting the water pressure). As another means, the mist spray volume may be controlled by, for example, adjusting the air pressure and keeping the flow rate of water constant.

Note that, for example, a general-purpose regulator (in which the water pressure is fixed) may be used instead of liquid flow control valve 14. Moreover, as a gas pressure control valve, for example, a member which is an electro-pneumatic regulator and has a function of controlling signals may be provided downstream of gas valve 15. Accordingly, the mist spray flow rate can be indirectly controlled by transmitting a signal from controller 30 to the gas pressure control valve and controlling the gas pressure.

The spraying by two-fluid nozzles 11 is started by opening liquid valve 16 after opening gas valve 15 and supplying gas to two-fluid nozzles 11. The spraying by fluid nozzles 11 is stopped by closing gas valve 15 after closing liquid valve 16.

In order to improve the responsiveness of the start of spraying by two-fluid nozzles 11 and prevent dripping from two-fluid nozzles 11 at the time of stopping of the spraying, a check valve may be provided in spray-device-side liquid flow path 13 at a position in proximity to each two-fluid nozzle 11, and a liquid discharge valve and a liquid discharge path for releasing the liquid pressure in spray-device-side liquid flow path 13 to the atmospheric pressure may be provided in proximity to the downstream side of liquid valve 16 in spray-device-side liquid flow path 13. Moreover, for the same purpose, a solenoid valve or an air operated valve may be provided in the liquid flow path at a position in proximity to each two-fluid nozzle 11.

Hereinafter, two-fluid nozzle 11 will be described in detail.

Figure 2A:
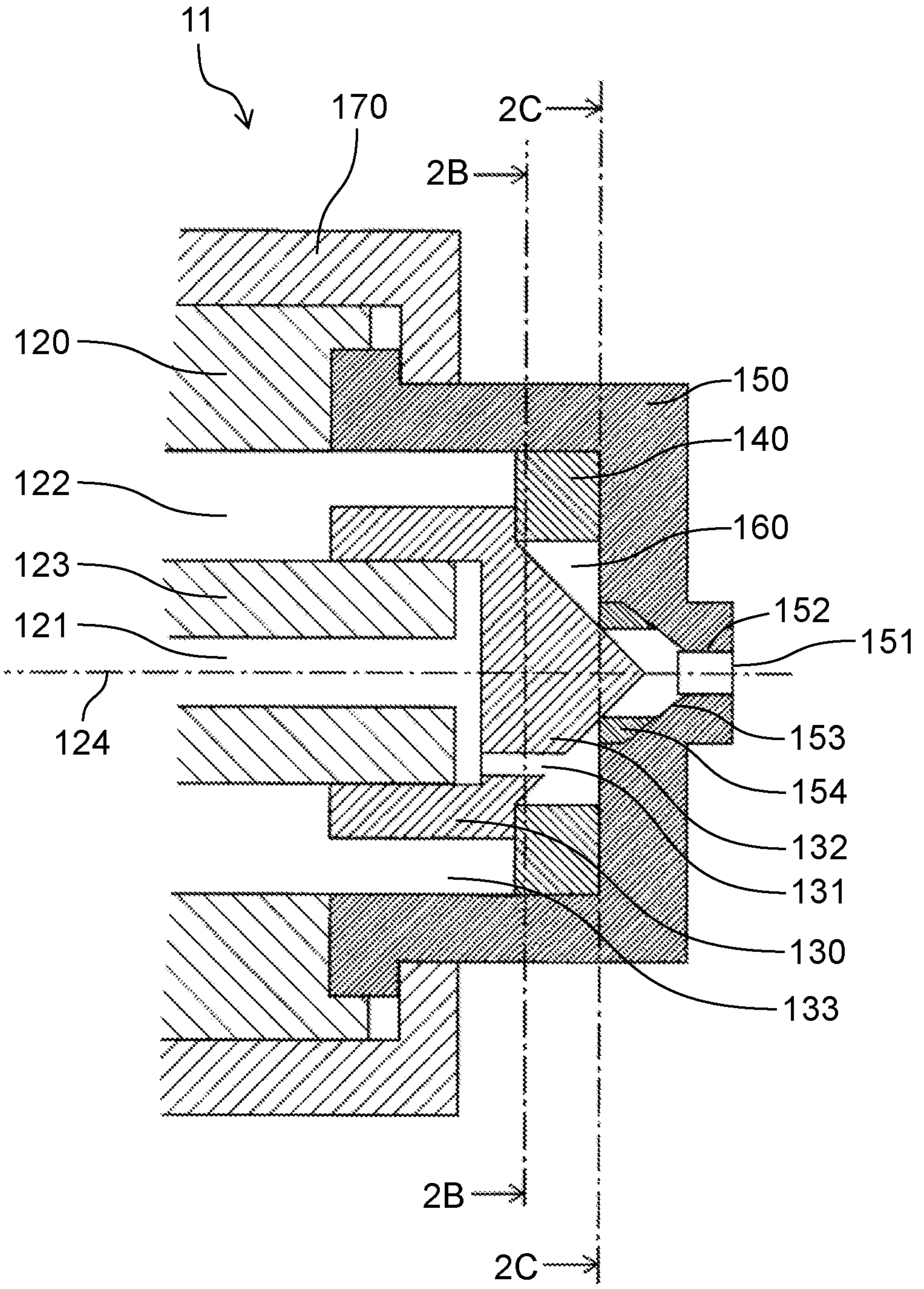
FIG. 2A is a cross-sectional view of a two-fluid nozzle of a spray device according to the present disclosure.

FIG. 2A is a cross-sectional view of two-fluid nozzle 11 of spray device A according to the first embodiment of the present disclosure. Hereinafter, a configuration of two-fluid nozzle 11 will be described with reference to FIG. 2A.

Two-fluid nozzle 11 at least includes two-fluid nozzle main body 120, liquid inlet portion 130, gas inlet portion 140, and gas-liquid ejection portion 150. Liquid inlet portion 130, gas inlet portion 140, and gas-liquid ejection portion 150 form gas-liquid mixing portion 160. Two-fluid nozzle 11 further includes gas-liquid ejection portion fixing portion 170.

Two-fluid nozzle main body 120 includes: nozzle-side liquid flow path 121 connected to spray-device-side liquid flow path 13 and provided along central axis 124 of a cylindrical member; and hollow cylindrical nozzle-side gas flow path 122 connected to spray-device-side gas flow path 12 and provided along the axial direction at intervals around nozzle-side liquid flow path 121. Nozzle-side liquid flow path 121 and nozzle-side gas flow path 122 are partitioned by hollow cylindrical portion 123 positioned in the central portion as part of two-fluid nozzle main body 120.

Only the tip portion of nozzle-side liquid flow path 121 is illustrated. A liquid supply port (not illustrated) at the rear end portion of nozzle-side liquid flow path 121 is connected to spray-device-side liquid flow path 13. Only the tip side of nozzle-side gas flow path 122 is also illustrated, and a gas supply port (not illustrated) at the read end portion of nozzle-side gas flow path 122 is connected to spray-device-side gas flow path 12. The tip portion of hollow cylindrical portion 123 protrudes toward the tip side relative to two-fluid nozzle main body 120 that is other than hollow cylindrical portion 123. Liquid inlet portion 130 is fixed to the tip portion of hollow cylindrical portion 123.

Liquid inlet portion 130 is provided at the tip portion of two-fluid nozzle main body 120 so as to cover the opening of nozzle-side liquid flow path 121 connected to spray-device-side liquid flow path 13. Liquid inlet portion 130 includes a groove-shaped liquid flow path on a face that opposes the end surface of cylindrical portion 123. Liquid inflow port 131 penetrating liquid inlet portion 130 in the direction of central axis 124 is provided in at least one position radially deviated (in the vertical direction in FIG. 2A) from central axis 124 of liquid inlet portion 130. In other words, liquid inflow port 131 is provided in liquid inlet portion 130, penetrating liquid inlet portion 130 in at least one position radially deviated from central axis 124 of liquid inlet portion 130.

Liquid inflow port 131 is positioned, for example, upstream of gas-liquid mixing portion 160, and in proximity to the inner peripheral surface of annular gas inlet portion 140. Liquid inflow port 131 communicates nozzle-side liquid flow path 121 and gas-liquid mixing portion 160 for leading the liquid flow in nozzle-side liquid flow path 121 into gas-liquid mixing portion 160. The tip surface of liquid inlet portion 130 has a tapered portion, for example, conical protrusion 132, protruding into gas-liquid mixing portion 160. Protrusion 132 protrudes along central axis 124 such that the central axis of protrusion 132 coincides with central axis 124.

Gas-liquid ejection portion 150 is provided at the tip of two-fluid nozzle main body 120 so as to cover liquid inlet portion 130, gas inlet portion 140, and the opening of nozzle-side gas flow path 122. Gas-liquid ejection portion 150 has a cross section with a generally omega shape. Gas-liquid ejection portion 150 has hollow cylindrical gap 133, which is a predetermined interval, between gas-liquid ejection portion 150 and liquid inlet portion 130.

The tip end portion of gas-liquid ejection portion 150 includes tubular flow path 151 through which gas-liquid mixture fluid flows out and ejection port 152 which is in communication with tubular flow path 151 for ejecting the gas-liquid mixture fluid. Moreover, the inner surface of the tip end portion of gas-liquid ejection portion 150 includes tapered conical flow path 153 that is in communication with tubular flow path 151. Tapered flow path 153 includes rectifying portion 154 having an opening with an uneven surface.

The tip of protrusion 132 of liquid inlet portion 130 and the opening with the uneven surface of rectifying portion 154 form rectified flow outlet 155. Rectified flow outlet 155 is provided with the tip of protrusion 132 being inserted into the uneven opening of rectifying portion 154.

Gas-liquid ejection portion 150 is sandwiched and fixed between gas-liquid ejection portion fixing portion 170 and the end face of two-fluid nozzle main body 120. It may be that gas-liquid ejection portion fixing portion 170 is not provided and gas-liquid ejection portion 150 is directly fixed to the end face of two-fluid nozzle main body 120.

Figure 2B:
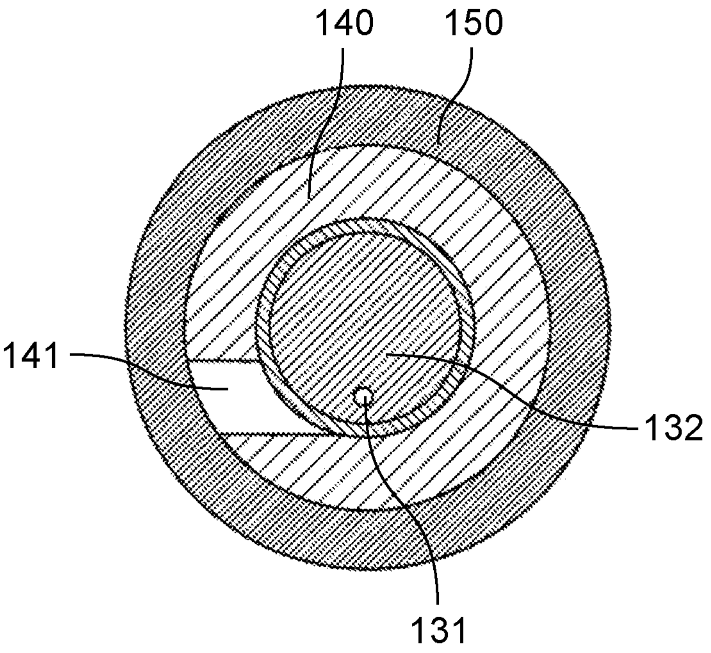
FIG. 2B is a cross-sectional view of the two-fluid nozzle according to the present disclosure taken along line 2B-2B in FIG. 2A.

FIG. 2B is a cross-sectional view of two-fluid nozzle 11 taken along line 2B-2B in FIG. 2A. As illustrated in FIG. 2B, a notch or a gap is provided in at least one position of gas inlet portion 140 along the tangential direction of the inner circumference of annular gas inlet portion 140, so that gas inflow port 141 is provided. Gas inflow port 141 is in communication with nozzle-side gas flow path 122 to lead the gas flow into the gas inlet portion.

Gas inflow port 141 is provided in proximity to liquid inflow port 131 such that the inflow direction of the gas flow that flows in gas inflow port 141 intersects with (for example, is orthogonal to) the inflow direction of the liquid flow that flows in liquid inflow port 131. The gas flow flowing in gas inflow port 141 collides with the liquid flow flowing in liquid inflow port 131, and circles around along the inner peripheral surface of annular gas inlet portion 140, atomizing the liquid.

Figure 2C:
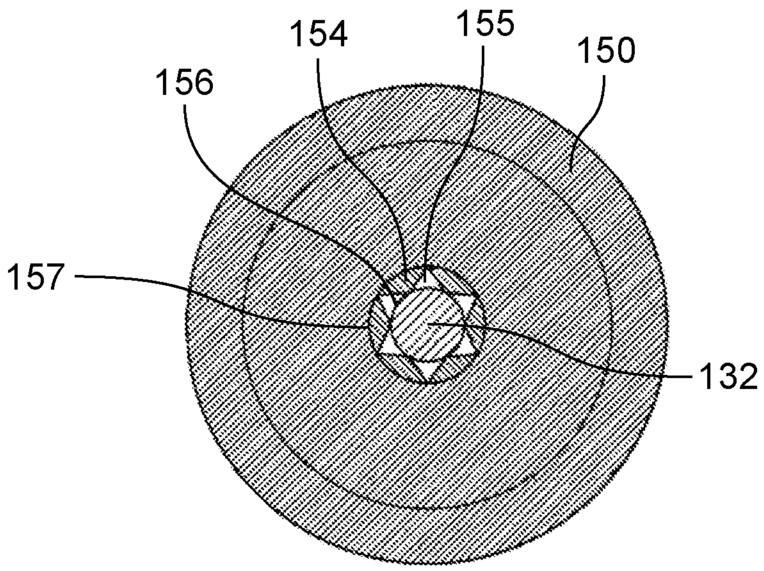
FIG. 2C is a cross-sectional view of the two-fluid nozzle according to the present disclosure taken along line 2C-2C in FIG. 2A.

FIG. 2C is a cross-sectional view of two-fluid nozzle 11 taken along line 2C-2C in FIG. 2A. As illustrated in FIG. 2C, rectifying portion 154 has an opening with an uneven surface. Rectified flow outlet 155 is provided between the opening with the uneven surface and protrusion 132. The uneven opening of rectifying portion 154 includes teeth in a triangular shape or the like on the inner peripheral surface of a hollow cylinder or hollow cone about the axis of the cylinder or cone at predetermined intervals or equal intervals like internal gears. The teeth in a triangular shape or the like protrude at predetermined intervals or equal intervals, and rectified flow outlet 155 is formed between adjacent teeth.

Here, rectified flow outlet 155 has an annular shape having recesses and protrusions on the outer periphery in a state where the tip portion of protrusion 132 is inserted into the uneven opening of rectifying portion 154. The uneven shape of rectifying portion 154 is formed such that a plurality of recesses and protrusions with the same or similar shape are arranged equally or at predetermined intervals around the axis of protrusion 132 and are arranged symmetrically around the axis, for example, being rotationally symmetric.

As illustrated in FIG. 2A and FIG. 2C, an example of rectified flow outlet 155 is a plurality of triangular rectified flow outlets 155 in which the inner edge of the uneven opening of rectifying portion 154 are in contact with the tip portion of conical protrusion 132 and are partitioned from each other.

With such a configuration, the liquid supplied to two-fluid nozzle 11 flows through nozzle-side liquid flow path 121 in two-fluid nozzle main body 120 from the liquid supply port (not illustrated) to the tip side of two-fluid nozzle 11, and becomes a liquid flow. The liquid flow is supplied to gas-liquid mixing portion 160 through nozzle-side liquid flow path 121 and liquid inflow port 131. Moreover, the gas supplied to two-fluid nozzle 11 flows through nozzle-side gas flow path 122 in two-fluid nozzle main body 120 from the gas supply port (not illustrated) to the tip side of two-fluid nozzle 11, and becomes a gas flow. The gas flow is supplied to gas-liquid mixing portion 160 through gap 133 and gas inflow port 141.

When the gas flow and the liquid flow are supplied to gas-liquid mixing portion 160, the gas flow and the liquid flow are mixed with each other in gas-liquid mixing portion 160, and the liquid is atomized. After that, the mixed and atomized liquid is rectified through rectified flow outlet 155 made of the uneven opening of rectifying portion 154 and protrusion 132, and is ejected to the outside from ejection port 152 through tubular flow path 151 of gas-liquid ejection portion 150.

Here, the mechanism of atomization in gas-liquid mixing portion 160 will be described below.

The liquid flow that has flown through nozzle-side liquid flow path 121 passes through liquid inflow port 131 of liquid inlet portion 130, and the liquid flow is supplied to gas-liquid ejection portion 150 from gas-liquid mixing portion 160 in proximity to the inner surface of annular gas inlet portion 140.

On the other hand, the gas flow supplied to gas-liquid mixing portion 160 through gas inflow port 141 collides with the liquid flow supplied from liquid inflow port 131 to gas-liquid mixing portion 160, and circles around along the inner peripheral surface of annular gas inlet portion 140. Such a collision spreads the liquid over the inner peripheral surface of annular gas inlet portion 140, so that the liquid turns into a thin film. Moreover, the liquid changes from the thin film to finer droplets by flowing in the circumferential direction along the inner peripheral surface of annular gas inlet portion 140.

Moreover, the gas-liquid mixture fluid containing the droplets is stirred in gas-liquid mixing portion 160, so that the droplets can be further atomized, and liquid having a smaller average particle size can be sprayed through ejection port 152. Specifically, annular gas inlet portion 140 forming gas-liquid mixing portion 160 has an inner diameter of 6.0 mm and a height of 1.9 mm. Inscribed circle 156 of the uneven opening of rectifying portion 154 has a diameter of 1.9 mm, circumscribed circle 157 of the opening of rectifying portion 154 has a diameter of 2.8 mm, and the area of the opening of rectifying portion 154 is 4.52 $mm^2$. Tubular flow path 151 of gas-liquid ejection portion 150 has a diameter of 1.0 mm and has a cross-sectional area of 0.79 $mm^2$. Liquid inflow port 131 has a diameter of 0.6 mm. The cross section of the flow path in the direction orthogonal to the axis of gas inflow port 141 is rectangular, has a width of 2.0 mm, and has a height of 1.0 mm. The diameter of the bottom surface of conical protrusion 132 is 6 mm, and the height of protrusion 132 is 2.8 mm. The opening area of rectified flow outlet 155 is 1.6 $mm^2$.

For example, compressed air is supplied as gas to the gas supply port of two-fluid nozzle 11 at a pressure of 0.5 MPa (gauge pressure), and water is supplied as liquid to the liquid supply port of two-fluid nozzle 11 at a pressure of 0.509 MPa (gauge pressure). The Sauter mean diameter of the liquid atomized under the conditions described above was evaluated by a laser diffraction method. The measurement distance of the laser diffraction method was 300 mm from the tip portion of two-fluid nozzle 11, and the Sauter mean diameter was 6.0 μm.

Console 40 is connected to external signal input terminal 33 in controller 30 via signal wiring 32. Console 40 transmits an output signal to controller 30, and adjusts the valve opening degree of liquid flow control valve 14 via controller 30.

At this time, first, the output signal of the pulse from console 40 is transmitted to controller 30 via signal wiring 32.

Next, controller 30 controls the spray flow rate of mist 91 in multiple levels by adjusting the valve opening degree of liquid flow control valve 14 in multiple levels based on the received pulse. This allows the mist concentration to be adjusted in multiple levels. Accordingly, for example, with a fader provided on console 40, the mist concentration in indoor space 90 can be adjusted in multiple levels in conjunction with the intuitive changes of the output.

As an example of the multilevel adjustment, controller 30 is capable of controlling each two-fluid nozzle 11 at about 2 ml/min per single pulse in adjusting the valve opening degree of liquid flow control valve 14 based on the received pulse. More specifically, when fifteen two-fluid nozzles 11 are connected to one liquid flow control valve 14, the overall resolution is approximately 20 ml/min, the resolution per one two-fluid nozzle is approximately 2 ml/min, and, for example, 256 gradations can be represented.

Note that a plurality of spray devices A may be connected to one console 40. Moreover, the number of two-fluid nozzles 11 connected to one spray device A is not limited to one, but may be more than one as illustrated in FIG. 1. Accordingly, the spray flow rate of each of the plurality of spray devices A can be set by using one console 40 as a master controller. As a result, the mist concentration in indoor space 90 can be adjusted in multiple levels for respective spray areas of two-fluid nozzles 11 connected to the plurality of spray devices A.

As another example, controller 30 is capable of automatically adjusting the spray flow rate of mist 91 by adjusting the valve opening degree of liquid flow control valve 14 at a preset time.

According to the first embodiment, controller 30 adjusts the valve opening degree of liquid flow control valve 14 to spray mist that is atomized liquid into indoor space 90 with two-fluid nozzles 11, so that the mist concentration in indoor space 90 can be adjusted in multiple levels, and the mist space can be staged in various forms.

Figure 3:
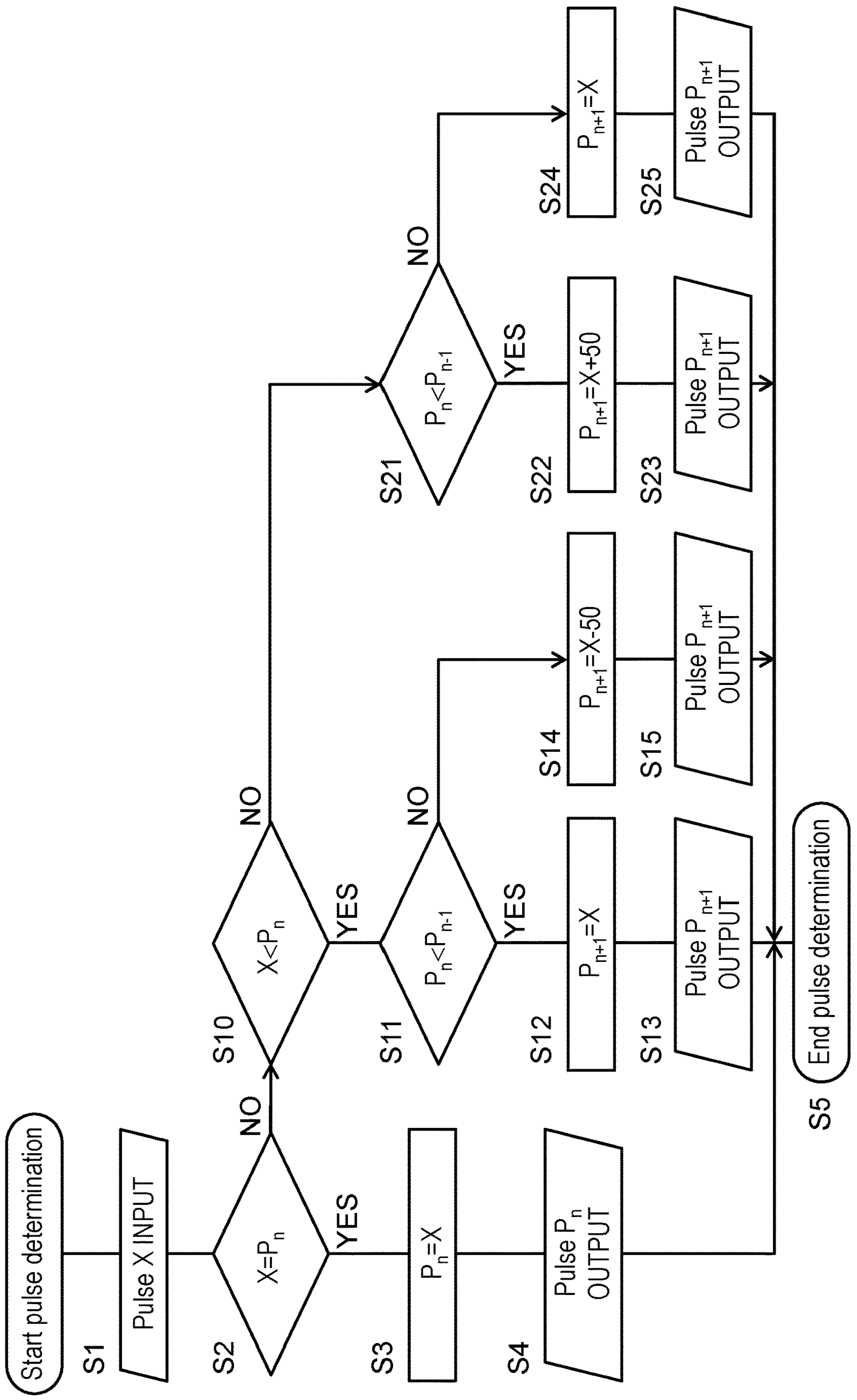
FIG. 3 is a flowchart of a pulse determination operation in a mist space staging system according to a variation of the present disclosure.

Further, as a variation of the first embodiment, as illustrated in FIG. 3, controller 30 may correct the received pulse signal in accordance with the magnitude of the increase or decrease of the pulse signal received from console 40, and then drive liquid flow control valve 14. The pulse signal received by controller 30 from console 40 is also referred to as a received pulse signal.

Specifically, controller 30 may correct the pulse for driving liquid flow control valve 14 to be less than the pulse signal received from console 40 when the received pulse signal changes from an increasing state to a decreasing state. When the pulse signal received from console 40 changes from the decreasing state to the increasing state, controller 30 may correct the pulse for driving liquid flow control valve 14 to be greater than the received pulse signal.

The reason for such a correction is as described below. Backlash exists in the mechanism of the connecting portion between the pulse motor and the valve. Due to this backlash, a minute pulse does not change the valve opening degree. Accordingly, when the input pulse signal instructs the opposite direction to the valve opening degree, the pulse signal is corrected to improve the responsiveness to the pulse signal.

This will be described in more detail.

FIG. 3 illustrates a flow of a pulse determination operation performed by controller 30.

First, in step S1, a pulse signal including pulse X is received from console 40. Pulse X is the pulse of a pulse signal that adjusts the valve opening degree of liquid flow control valve 14.

Next, in step S2, pulse X and current pulse $P_n$ indicating the current valve opening degree of liquid flow control valve 14 are compared to determine whether or not they are equal to each other. When they are equal to each other, the process proceeds to step S3, and when they are not equal to each other, the process proceeds to step S10.

In step S3, current pulse $P_n$ is defined as pulse X, and the process proceeds to step S4. In step S4, controller 30 outputs current pulse $P_n$ to liquid flow control valve 14, and the process proceeds to step S5 without changing the valve opening degree. In step S5, the pulse determination ends.

On the other hand, in step S10, it is determined whether or not pulse X is less than current pulse $P_n$ indicating the current valve opening degree of liquid flow control valve 14. When pulse X is less than current pulse $P_n$, the process proceeds to step S11, and when not, the process proceeds to step S21. Here, "pulse X is less than current pulse $P_n$" means that the valve opening degree changes in the closing direction. "When not" means that the valve opening degree changes in the opening direction.

In step S11, it is determined whether or not current pulse $P_n$ is less than immediately preceding pulse $P_{n-1}$ of liquid flow control valve 14. When current pulse $P_n$ is less than immediately preceding pulse $P_{n-1}$, the process proceeds to step S12, and when not, the process proceeds to step S14. Here, "current pulse $P_n$ is less than immediately preceding pulse $P_{n-1}$" means that the valve opening degree is changing in the closing direction from the immediately preceding pulse to the current pulse. Accordingly, proceeding to step S12 means that the valve opening degree changes in the closing direction in the order of immediately preceding pulse $P_{n-1}$, current pulse $P_n$, and input pulse X. On the other hand, "when not", that is, proceeding to step S14 means that the valve opening degree was changing in the closing direction in the order of immediately preceding pulse $P_{n-1}$ and current pulse $P_n$ but the valve opening degree changes in the opening direction from current pulse $P_n$ to input pulse X.

In step S12, next pulse $P_{n+1}$ is defined as pulse X, and the process proceeds to step S13. In step S13, controller 30 outputs, as next pulse $P_{n-1}$, pulse X without change to liquid flow control valve 14 to change the valve opening degree in the closing direction, and the process proceeds to step S5. In step S5, the pulse determination ends.

In step S14, next pulse $P_{n-1}$ is defined as a value obtained by subtracting 50 from pulse X, and the process proceeds to step S15. In step S15, controller 30 outputs next pulse $P_{n-1}$ to liquid flow control valve 14 to change the valve opening degree in the opening direction, and the process proceeds to step S5. In step S5, the pulse determination ends. Here, the subtraction of 50 from pulse X is a correction of the pulse signal with respect to the backlash described above.

In step S21, it is determined whether or not current pulse $P_n$ is less than immediately preceding pulse $P_{n-1}$. When current pulse $P_n$ is less than immediately preceding pulse $P_{n-1}$, the process proceeds to step S22, and when not, the process proceeds to step S24. Here, "current pulse $P_n$ is less than immediately preceding pulse $P_{n-1}$" means that the valve opening degree changes in the closing direction. Accordingly, proceeding to step S22 means that the valve opening degree was changing in the closing direction in the order of immediately preceding pulse $P_{n-1}$ and current pulse $P_n$ but the valve opening degree changes in the opening direction from current pulse $P_n$ to input pulse X. In contrast, "when not" means, that is, proceeding to step S24 means that the valve opening degree changes in the opening direction in the order of immediately preceding pulse $P_{n-1}$, current pulse $P_n$, and input pulse X.

In step S22, next pulse $P_{n-1}$ is defined as a value obtained by adding 50 to pulse X, and the process proceeds to step S23. In step S23, controller 30 outputs next pulse $P_{n-1}$ to liquid flow control valve 14 to change the valve opening degree in the opening direction from the closing direction, and the process proceeds to step S5. In step S5, the pulse determination ends.

In step S24, next pulse $P_{n-1}$ is defined as pulse X, and the process proceeds to step S25. In step S25, controller 30 outputs pulse X without change as next pulse $P_{n-1}$ to liquid flow control valve 14 to change the valve opening degree in the opening direction, and the process proceeds to step S5. In step S5, the pulse determination ends.

In such a manner, controller 30 corrects the pulse for driving liquid flow control valve 14 to be less or greater than the received pulse signal when the received pulse signal changes from the increasing state to the decreasing state or from the decreasing state to the increasing state. Accordingly, the responsiveness to the pulse signal can be improved.

Second Embodiment

Figure 4:
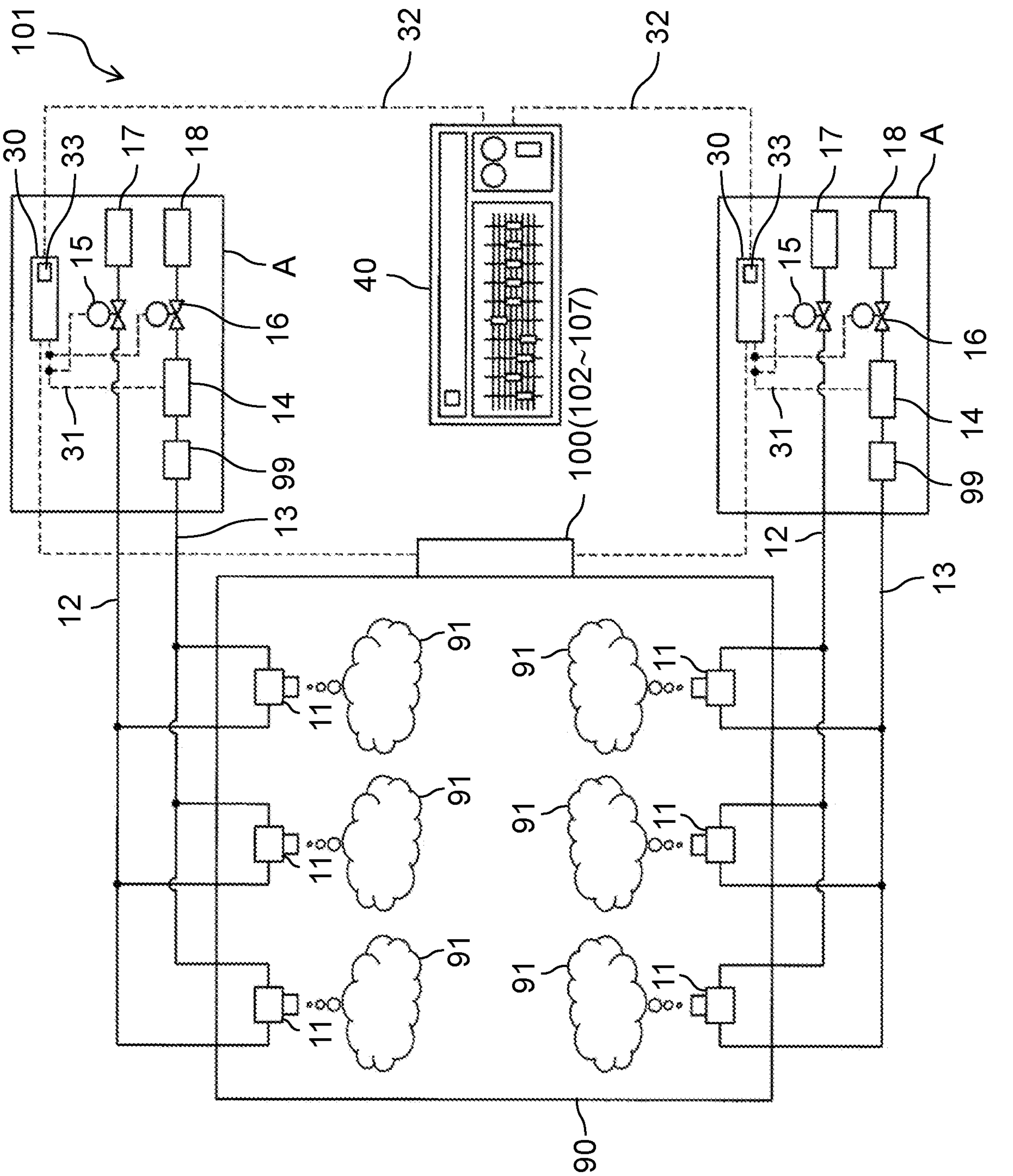
FIG. 4 is a configuration diagram of a mist space staging system which includes spray devices according to the present disclosure.

FIG. 4 is a configuration diagram of a mist space staging system according to a second embodiment of the present disclosure.

The mist space staging system according to the present embodiment is different from the mist space staging system according to the first embodiment in that flow meters 99 are further included in addition to the elements of the mist space staging system according to the first embodiment. In the following, with respect to the mist space staging system according to the present embodiment, description of the matters which have been described in the first embodiment will be omitted as appropriate, and the differences from the mist space staging system according to the first embodiment will be mainly described. The structural elements included in the mist space staging system according to the present embodiment that are substantially the same as the structural elements included in the mist space staging system described in the first embodiment are assigned the same reference signs, and the description thereof will be omitted or simplified.

In FIG. 4, mist space staging system 101 further includes flow meters 99 each of which is provided in spray-device-side liquid flow path 13 to detect the flow rate of the liquid flowing through spray-device-side liquid flow path 13.

Each flow meter 99 is provided in spray-device-side liquid flow path 13, at an arbitrary position between liquid flow control valve 14 and two-fluid nozzles 11 to detect the flow rate of the liquid in spray-device-side liquid flow path 13 positioned downstream of liquid flow control valve 14, and transmit the detection result to controller 30. Controller 30 adjusts the valve opening degree of liquid flow control valve 14 in accordance with the flow rate detected by flow meter 99.

With such a configuration, an appropriate liquid supply flow rate can be controlled with flow meter 99, regardless of the installation height of two-fluid nozzles 11.

Third Embodiment

FIG. 4 is a configuration diagram of a mist space staging system according to a third embodiment of the present disclosure.

The mist space staging system according to the present embodiment is different from the mist space staging system according to the first embodiment in that video projection device 102 is included as staging device 100 in addition to the elements of the mist space staging system described in the first embodiment. In the following, with respect to the mist space staging system according to the present embodiment, description of the matters which have been described in the first embodiment will be omitted as appropriate, and the differences from the mist space staging system according to the first embodiment will be mainly described. The structural elements included in the mist space staging system according to the present embodiment that are substantially the same as the structural elements included in the mist space staging system described in the first embodiment are assigned the same reference signs, and the description thereof will be omitted or simplified.

Mist space staging system 101 according to the third embodiment includes one or more spray devices A and staging device 100. The mist concentration is adjusted in multiple levels by the control of controller 30 performed in conjunction with an output from staging device 100. In the present embodiment, a dial switch (not illustrated) may be used instead of console 40 to adjust the mist concentration.

In FIG. 4, staging device 100 includes at least one of a lighting device (not illustrated) or image projection device 102, and controller 30 performs control such that the mist concentration is adjusted in multiple levels in accordance with the intensity of the light flux from at least one of the lighting device or image projection device 102. For example, the mist concentration can be increased in multiple levels when the intensity of the light flux is gradually increased, or the mist concentration can be decreased in multiple levels when the intensity of the light flux is gradually decreased.

One specific example of various staging forms is a staging form which generates fog in a spotlight manner in part of the space instead of generating mist uniformly in the space. Another example is that the floor is filled with heavy fog with the mist from spray device A to stage a sea of clouds, and then strong light from at least one of the lighting device or image projection device 102 is emitted to the floor. Another example is that the flow rate of the mist from spray device A is decreased compared with the previous example to stage light fog such as morning fog. Another example is that the flow rate of the mist from spray device A is increased as compared with the previous example in order to fill the target space with fog in a short period. In contrast, the flow rate may be decreased compared with the previous example in order to stage light fog slowly over time.

Such various staging forms can be produced by increasing the number of two-fluid nozzles 11 that are provided twice or three times more than usual with respect to one space, and finely changing the number of two-fluid nozzles 11 to be used for spraying. However, such a configuration requires a large number of nozzles. In view of the above, in order to reduce the number of nozzles, the mist space staging system according to the present embodiment may be used to adjust and change the flow rate of each two-fluid nozzle 11 in multiple levels with a smaller number of nozzles, so that the various staging forms as described above can be provided.

Embodiment 4

FIG. 1 and FIG. 4 each illustrate a configuration diagram of a mist space staging system according to a fourth embodiment of the present disclosure.

The mist space staging system according to the present embodiment is different from the mist space staging system according to the third embodiment in that audio device 103 is included as staging device 100 in addition to the structural elements of the mist space staging system described in the third embodiment. In the following, with respect to the mist space staging system according to the present embodiment, description of the matters which have been described in the third embodiment will be omitted as appropriate, and the differences from the mist space staging system according to the third embodiment will be mainly described. The structural elements included in the mist space staging system according to the present embodiment that are substantially the same as the structural elements included in the mist space staging system described in the first embodiment are assigned the same reference signs, and the description thereof will be omitted or simplified.

In the present embodiment, staging device 100 includes audio device 103. The mist concentration is adjusted in multiple levels by the control of controller 30 performed in accordance with the intensity of the sound output from audio device 103. For example, the mist concentration can be increased in multiple levels when the sound is gradually increased, or the mist concentration can be decreased in multiple levels when the sound is gradually decreased.

Specific examples of various staging forms in the fourth embodiment are the same as those in the third embodiment. Moreover, for example, when the mist spray flow rate from spray device A is fixed, the mist concentration also changes with respect to the space in a certain time. The length of time the mist concentration changes can be adjusted by adjusting the mist spray flow rate. In such a staging form, by changing the mist concentration in conjunction with the sound output from audio device 103, the sound heard by the auditory sense also stimulates the visual sense, so that the stage effect can be enhanced.

Fifth Embodiment

FIG. 1 and FIG. 4 each illustrate a configuration diagram of a mist space staging system according to a fifth embodiment of the present disclosure.

The mist space staging system according to the present embodiment is different from the mist space staging system according to the third embodiment in that at least one of odor generator 104 or odor elimination device 105 is included as staging device 100 in addition to the elements of the mist space staging system described in the third embodiment. In the following, with respect to the mist space staging system according to the present embodiment, description of the matters which have been described in the third embodiment will be omitted as appropriate, and the differences from the mist space staging system according to the third embodiment will be mainly described. The structural elements included in the mist space staging system according to the present embodiment that are substantially the same as the structural elements included in the mist space staging system described in the first embodiment are assigned the same reference signs, and the description thereof will be omitted or simplified.

In the present embodiment, staging device 100 includes at least one of odor generator 104 or odor elimination device 105. The mist concentration is adjusted by the control of controller 30 performed in accordance with the intensity of at least one of the odor generated by odor generator 104 and the odor remaining in the space after odor elimination performed by odor elimination device 105. For example, the mist concentration can be increased in multiple levels when the odor is gradually increased, or the mist concentration can be decreased in multiple levels when the odor is gradually decreased.

Specific examples of various staging forms in the fifth embodiment are the same as those in the third embodiment. In the staging form described above, the stage effect can be enhanced by causing odor generator 104 to generate odor in a spotlight manner in part of the space, and visually stimulating the odor felt by the sense of smell through the change in the mist concentration and the like. In addition, a possible staging form is to block the field of vision by filling the space with fog, and concentrate the user's nerves on the sense of smell, aiming for an aromatherapy effect (for example, improving concentration) by the odor generated from odor generation device 104. In addition to the odor, the intensity of the sound or video may also be adjusted in multiple levels to enhance the stage effects.

Sixth Embodiment

FIG. 1 and FIG. 4 each illustrate a configuration diagram of a mist space staging system according to a sixth embodiment of the present disclosure.

The mist space staging system according to the present embodiment is different from the mist space staging system according to the third embodiment in that at least one of air blower 106 or air conditioning device 107 is included as staging device 100 in addition to the elements of the mist space staging system described in the third embodiment. In the following, with respect to the mist space staging system according to the present embodiment, description of the matters which have been described in the third embodiment will be omitted as appropriate, and the differences from the mist space staging system according to the third embodiment will be mainly described. The structural elements included in the mist space staging system according to the present embodiment that are substantially the same as the structural elements included in the mist space staging system described in the first embodiment are assigned the same reference numerals, and the description thereof will be omitted or simplified.

In the present embodiment, staging device 100 includes at least one of air blower 106 or air conditioning device 107. The mist concentration is adjusted in multiple levels by the control of controller 30 performed in accordance with the intensity of the wind from at least one of air blower 106 or air conditioning device 107. For example, the mist concentration can be increased in multiple levels when the wind is gradually increased, or the mist concentration can be decreased in multiple levels when the wind is gradually decreased.

A specific example of various staging forms in the sixth embodiment is a staging form that represents invisible wind (for example, wind felt by touch) such that the wind can also be felt visually. For example, the movement of the wind can be visualized with mist to enhance the spatial stage effect. Multilevel adjustment of the mist is suitable for the above case, too, in order to represent a variety of scenes in a spotlight manner in the staging space in combination with the sea of clouds or morning mist in the previous example.

Seventh Embodiment

Figure 5A:
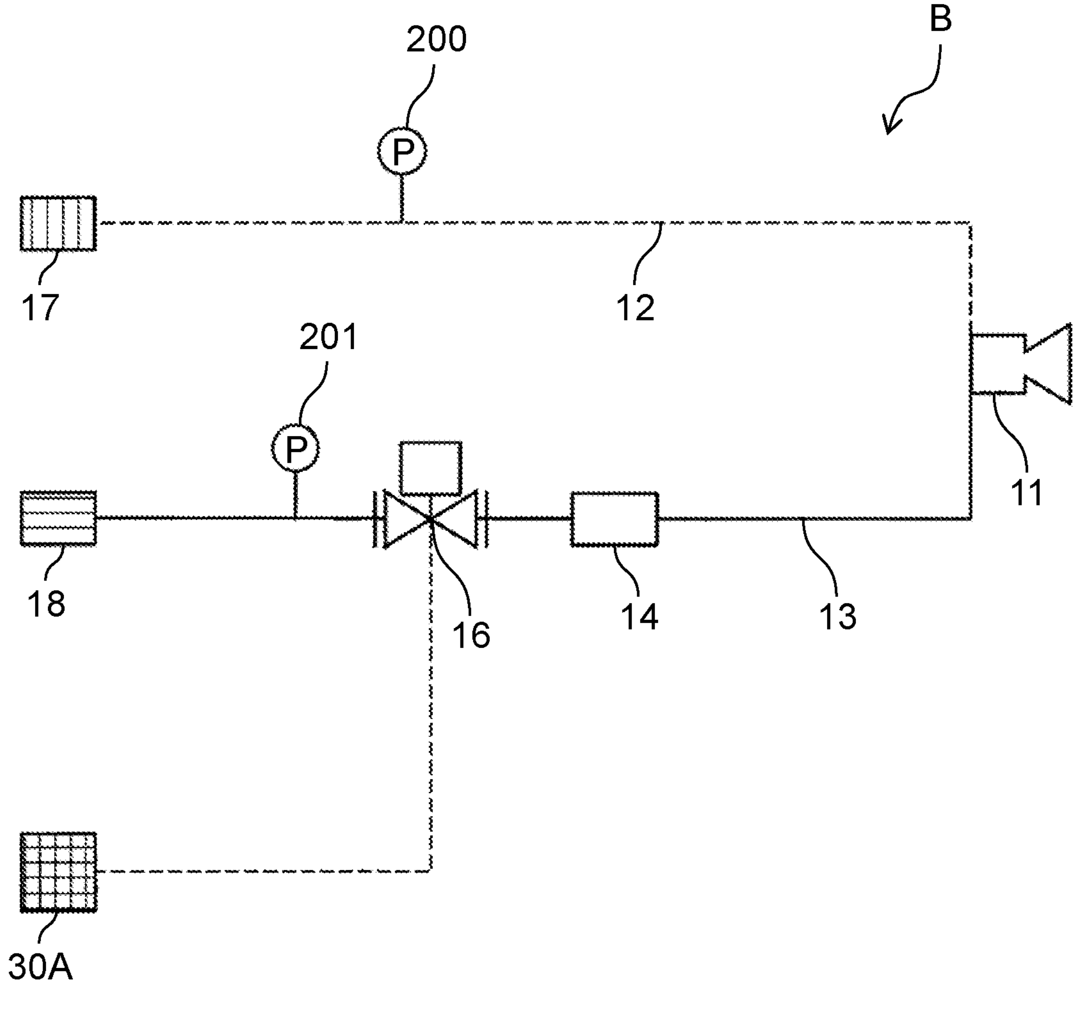
FIG. 5A is a configuration diagram of a spray device according to the present disclosure.

FIG. 5A is a configuration diagram of spray device B according to a seventh embodiment of the present disclosure.

Spray device B according to the present embodiment is different from spray device A according to the first embodiment in that controller 30A is included instead of controller 30, and gas pressure gauge 200 and liquid pressure gauge 201 are included in spray device A according to the first embodiment. In the following, with respect to spray device B according to the present embodiment, description of the matters which have been described in the first embodiment will be omitted as appropriate, and the differences from spray device A according to the first embodiment will be mainly described. The structural elements included in spray device B according to the present embodiment that are substantially the same as the structural elements included in spray device A described in the first embodiment are assigned the same reference numerals, and the description thereof will be omitted or simplified.

Spray device B includes two-fluid nozzles 11, spray-device-side gas flow path 12, gas supply source 17, spray-device-side liquid flow path 13, liquid supply source 18, liquid flow control valve 14, gas pressure gauge 200, liquid pressure gauge 201, liquid valve 16, and controller 30A. Liquid valve 16 is also referred to as on-off valve 16.

Two-fluid nozzles 11 spray mist obtained by mixing liquid and gas and atomizing the liquid.

Spray-device-side gas flow path 12 supplies gas to two-fluid nozzles 11.

Gas supply source 17 supplies gas to spray-device-side gas flow path 12.

Spray-device-side liquid flow path 13 supplies liquid to two-fluid nozzles 11.

Liquid supply source 18 supplies liquid to spray-device-side liquid flow path 13.

Liquid flow control valve 14 is provided in spray-device-side liquid flow path 13 between two-fluid nozzle 11 and liquid supply source 18. Liquid flow control valve 14 has a valve opening degree driven by pulses, that is, adjusted according to a pulse signal to control the flow rate of the liquid in spray-device-side liquid flow path 13.

Gas pressure gauge 200 is provided in spray-device-side gas flow path 12 between two-fluid nozzle 11 and gas supply source 17 to detect the pressure of the gas in spray-device-side gas flow path 12.

Liquid pressure gauge 201 is provided in spray-device-side liquid flow path 13 between liquid flow control valve 14 and liquid supply source 18 to detect the pressure of the liquid in spray-device-side liquid flow path 13.

Liquid valve 16 is provided in spray-device-side liquid flow path 13 between liquid flow control valve 14 and liquid pressure gauge 201 to open and close spray-device-side liquid flow path 13.

Controller 30A controls the opening and closing operation of liquid valve 16 based on the information on the gas pressure detected by gas pressure gauge 200, the liquid pressure detected by liquid pressure gauge 201, and the allowable pressure difference set by liquid flow control valve 14.

When the liquid pressure detected by liquid pressure gauge 201 is greater than the gas pressure detected by gas pressure gauge 200, and the pressure difference between the liquid pressure and the gas pressure is greater than or equal to the allowable pressure difference preset to liquid flow control valve 14, controller 30A closes liquid valve 16, and when the pressure difference between the liquid pressure and the gas pressure is less than the allowable pressure difference of liquid flow control valve 14, controller 30A opens liquid valve 16.

In such a manner, controller 30A causes liquid valve 16 to open and close spray-device-side liquid flow path 13, so that the pressure difference between the liquid pressure and the gas pressure does not become greater than or equal to the allowable pressure difference preset to liquid flow control valve 14. Accordingly, it is possible to reduce the occurrence of malfunctions of liquid flow control valve 14.

For example, when the allowable pressure difference of liquid flow control valve 14 is 0.3 MPa and the pressure difference between the liquid pressure and the gas pressure is greater than or equal to 0.3 MPa, liquid valve 16 is closed by controller 30A. When the pressure difference between the liquid pressure and the gas pressure is less than 0.3 MPa, liquid valve 16 is opened by controller 30A.

As liquid valve 16, for example, a two-way solenoid valve can be used, and a normally closed valve is preferable which is closed when no current is applied and is opened when current is applied.

Figure 5B:
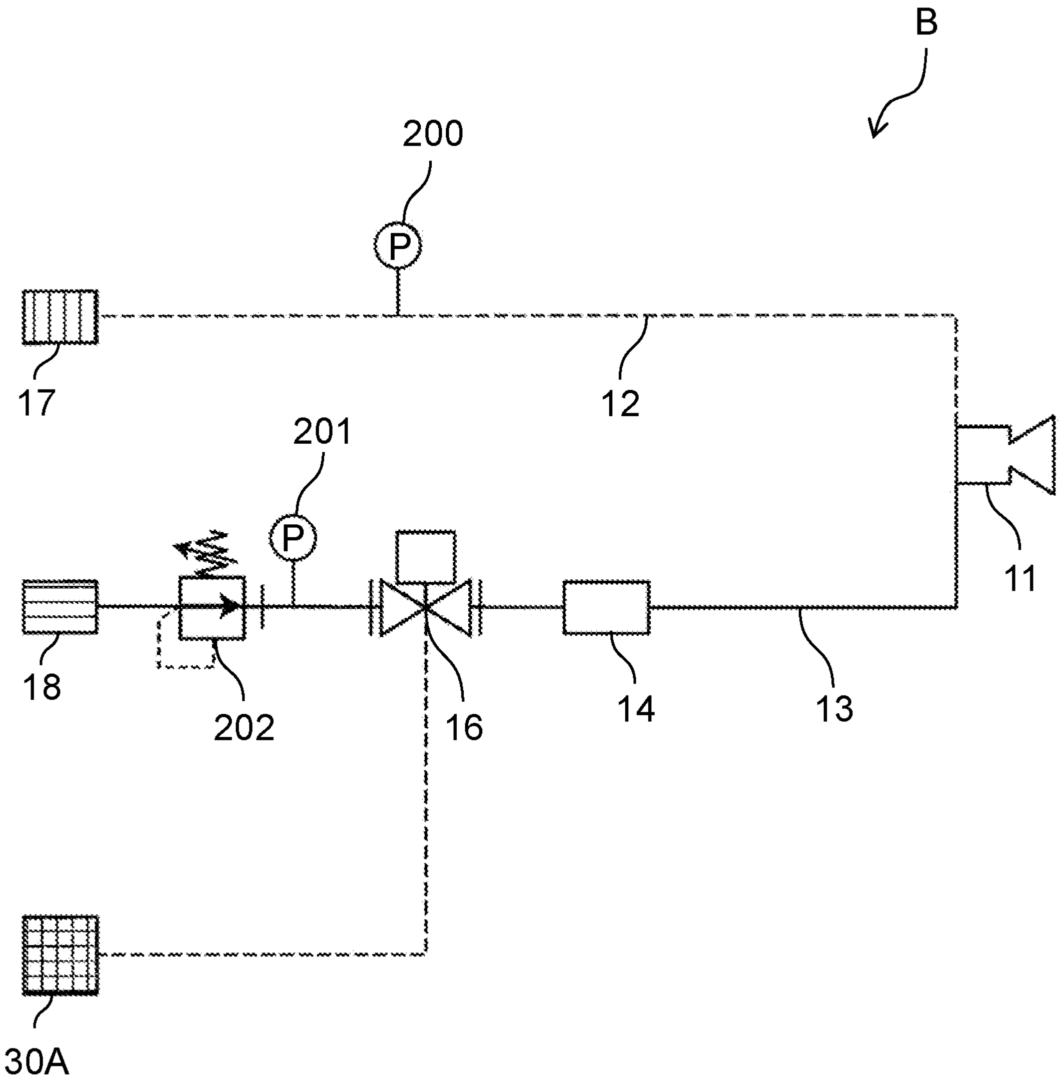
FIG. 5B is a configuration diagram of a spray device according to the present disclosure.

Moreover, as illustrated in FIG. 5B, as a variation of the seventh embodiment, pressure reducing valve 202 for reducing the pressure of the liquid discharged from liquid supply source 18 can be further provided in spray-device-side liquid flow path 13 between liquid pressure gauge 201 and liquid supply source 18.

In such a variation, pressure reducing valve 202 is controlled by controller 30A such that the pressure difference between the gas pressure detected by gas pressure gauge 200 and the liquid pressure detected by liquid pressure gauge 201 is less than the allowable pressure difference of liquid flow control valve 14.

Accordingly, the pressure difference between the pressure of the liquid supplied from liquid supply source 18 and the pressure of the gas supplied from gas supply source 17 does not become greater than or equal to the allowable pressure difference of liquid flow control valve 14, so that occurrence of malfunctions of liquid flow control valve 14 can be further reduced. In other words, by providing pressure reducing valve 202, liquid flow control valve 14 can be protected regardless of the pressure of the liquid supplied from liquid supply source 18.

When the pressure of the gas from gas supply source 17 is known and indicates a constant pressure, a manual pressure reducing valve which is capable of manually adjusting the pressure reduced value may be used as pressure reducing valve 202.

Embodiment 8

Figure 6A:
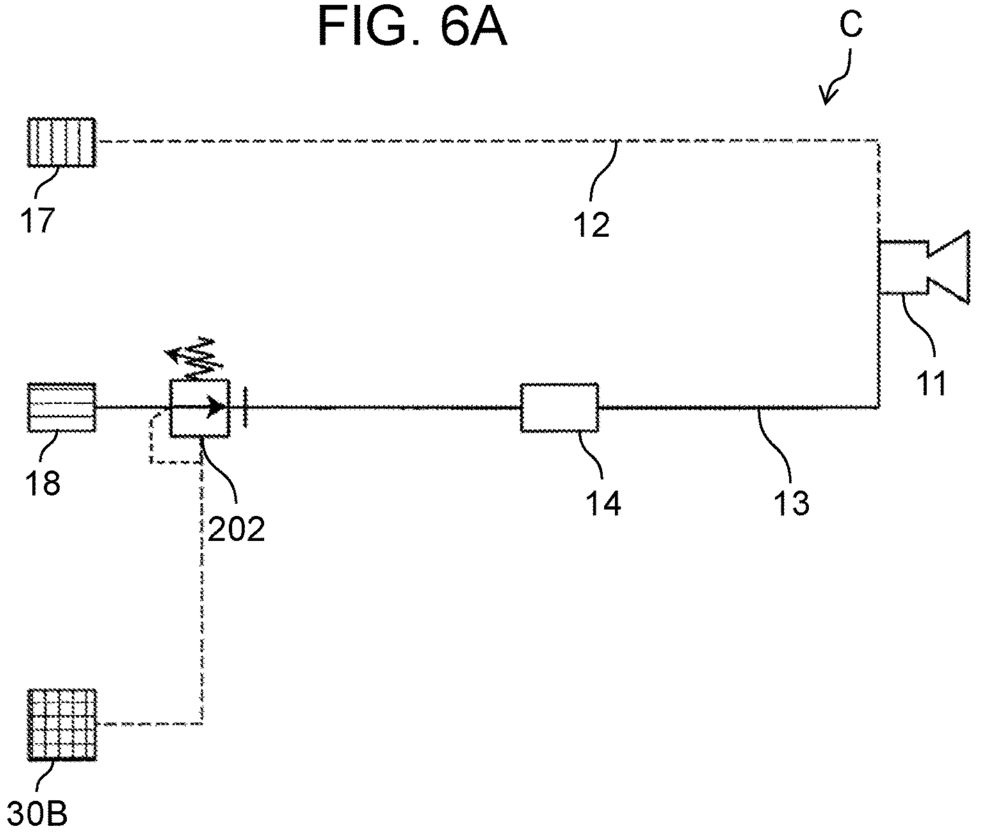
FIG. 6A is a configuration diagram of a spray device according to the present disclosure.

FIG. 6A is a configuration diagram of spray device C according to an eighth embodiment of the present disclosure.

Spray device C according to the present embodiment is different from spray device B according the seventh embodiment in that controller 30B is included instead of controller 30A, liquid valve 16, gas pressure gauge 200, and liquid pressure gauge 201 are not included, and pressure reducing valve 202 is adjusted by controller 30B in spray device B according to the variation of the seventh embodiment described in the seventh embodiment. In the following, with respect to spray device B according to the present embodiment, description of the matters which have been described in the seventh embodiment will be omitted as appropriate, and the differences from spray device B according to the seventh embodiment will be mainly described. The structural elements included in spray device C according to the present embodiment that are substantially the same as the structural elements included in spray device B described in the seventh embodiment are assigned the same reference signs, and the description thereof will be omitted or simplified.

Spray device C includes two-fluid nozzle 11, spray-device-side gas flow path 12, gas supply source 17, spray-device-side liquid flow path 13, liquid supply source 18, liquid flow control valve 14, pressure reducing valve 202, and controller 30B.

Pressure reducing valve 202 is provided in spray-device-side liquid flow path 13 between liquid flow control valve 14 and liquid supply source 18 in a similar manner to the variation of the seventh embodiment, to reduce the pressure of the liquid discharged from liquid supply source 18.

Controller 30B adjusts pressure reducing valve 202 based on the information on the pressure of the gas discharged from gas supply source 17, the pressure of the liquid discharged from liquid supply source 18, and the allowable pressure set to liquid flow control valve 14. Liquid flow control valve 14 has an allowable pressure set to the absolute pressure of the applied pressure. Liquid flow control valve 14 also has an allowable pressure to the relative pressure between the primary side and the secondary side, that is, the pressure difference between the upstream-side pressure of liquid flow control valve 14 and the downstream-side pressure of liquid flow control valve 14. The “allowable pressure” used by controller 30B for controlling pressure reducing valve 202 is the “allowable pressure” set to the relative pressure between the primary side and the secondary side.

Gas supply source 17 is a supply source, such as a tank, capable of discharging gas at a pressure set for gas, such that the pressure of the discharged gas is less than the allowable pressure of liquid flow control valve 14.

Liquid supply source 18 is a supply source, such as a pump, capable of discharging liquid at a pressure set for liquid.

Controller 30B adjusts pressure reducing valve 202 such that the pressure of the liquid discharged from liquid supply source 18 is less than the allowable pressure of liquid flow control valve 14. By the control of pressure reducing valve 202, the pressure of the gas discharged from gas supply source 17 becomes less than the allowable pressure of liquid flow control valve 14, and the pressure difference between the pressure of the gas discharged from gas supply source 17 and the pressure of the liquid discharged from liquid supply source 18 becomes less than the allowable pressure difference of liquid flow control valve 14. Accordingly, it is possible to reduce the occurrence of malfunctions of liquid flow control valve 14.

When the pressure of the gas in gas supply source 17 is known and indicates a constant pressure, a manual pressure reducing valve that is capable of manually adjusting the pressure reduced value may be used as pressure reducing valve 202.

Figure 6B:
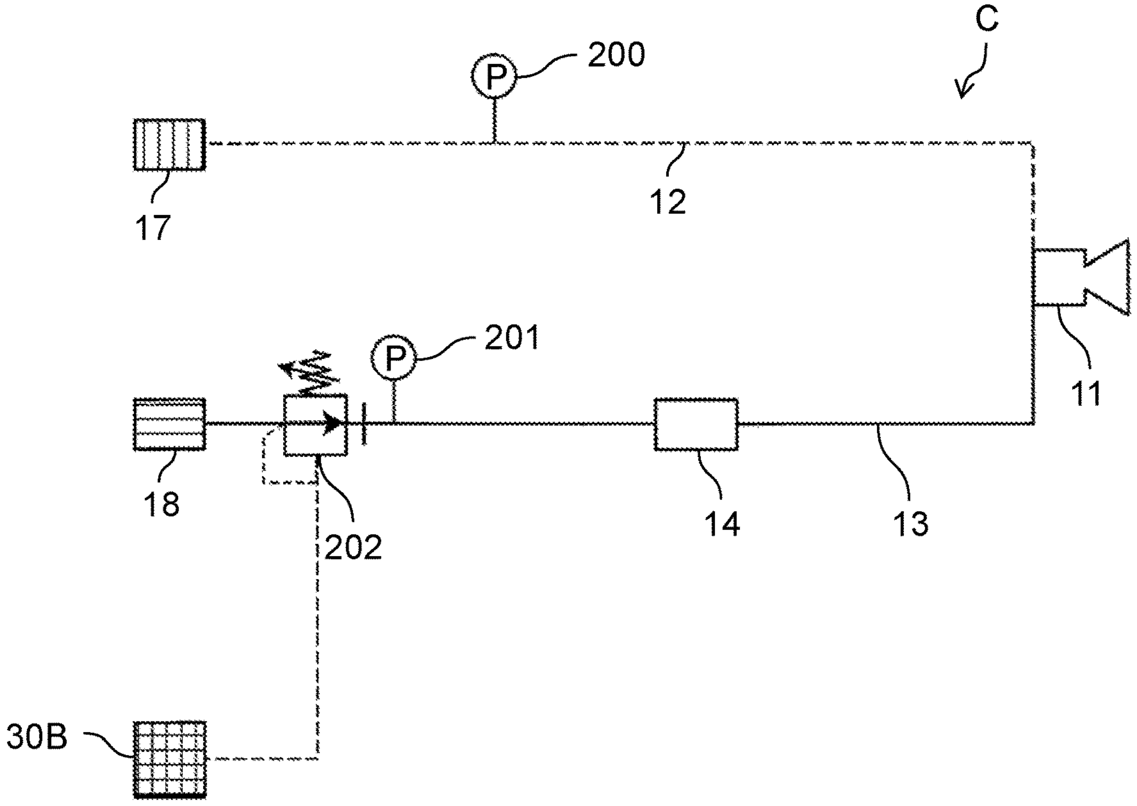
FIG. 6B is a configuration diagram of a spray device according to the present disclosure.

Moreover, as illustrated in FIG. 6B, as a variation of the eighth embodiment, spray device C may further include: gas pressure gauge 200 which is provided in spray-device-side gas flow path 12 between two-fluid nozzle 11 and gas supply source 17 to detect the pressure of the gas in spray-device-side gas flow path 12; and liquid pressure gauge 201 which is provided in spray-device-side liquid flow path 13 between liquid flow control valve 14 and liquid supply source 18 to detect the pressure of the liquid in spray-device-side liquid flow path 13.

Controller 30B controls the pressure of the gas from gas supply source 17 such that the gas pressure detected by gas pressure gauge 200 is less than the allowable pressure, and adjusts pressure reducing valve 202 such that the pressure difference between the gas pressure detected by gas pressure gauge 200 and the liquid pressure detected by liquid pressure gauge 201 is less than the allowable pressure difference. By doing so, the pressure of the liquid from liquid supply source 18 is controlled by pressure reducing valve 202 using the measured values of gas pressure gauge 200 and liquid pressure gauge 201 such that the pressure difference between the gas pressure and the liquid pressure, which are the measured values, are less than the allowable pressure difference of liquid flow control valve 14. The liquid is then supplied to liquid flow control valve 14. As a result, it is possible to further reduce the occurrence of malfunctions of liquid flow control valve 14.

Embodiment 9

Figure 7:
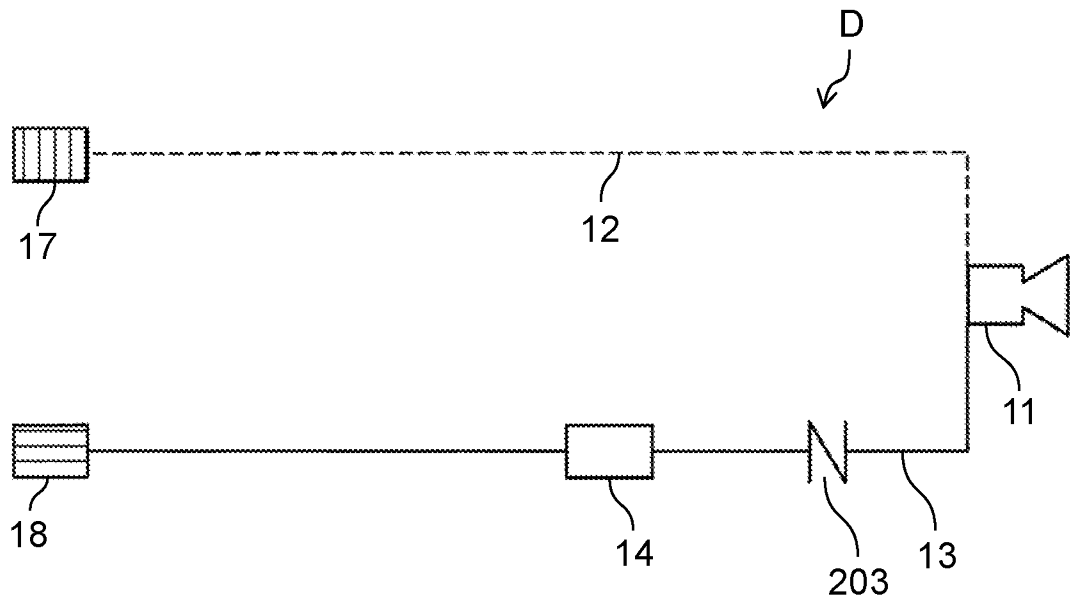
FIG. 7 is a configuration diagram of a spray device according to the present disclosure.
Figure 8:
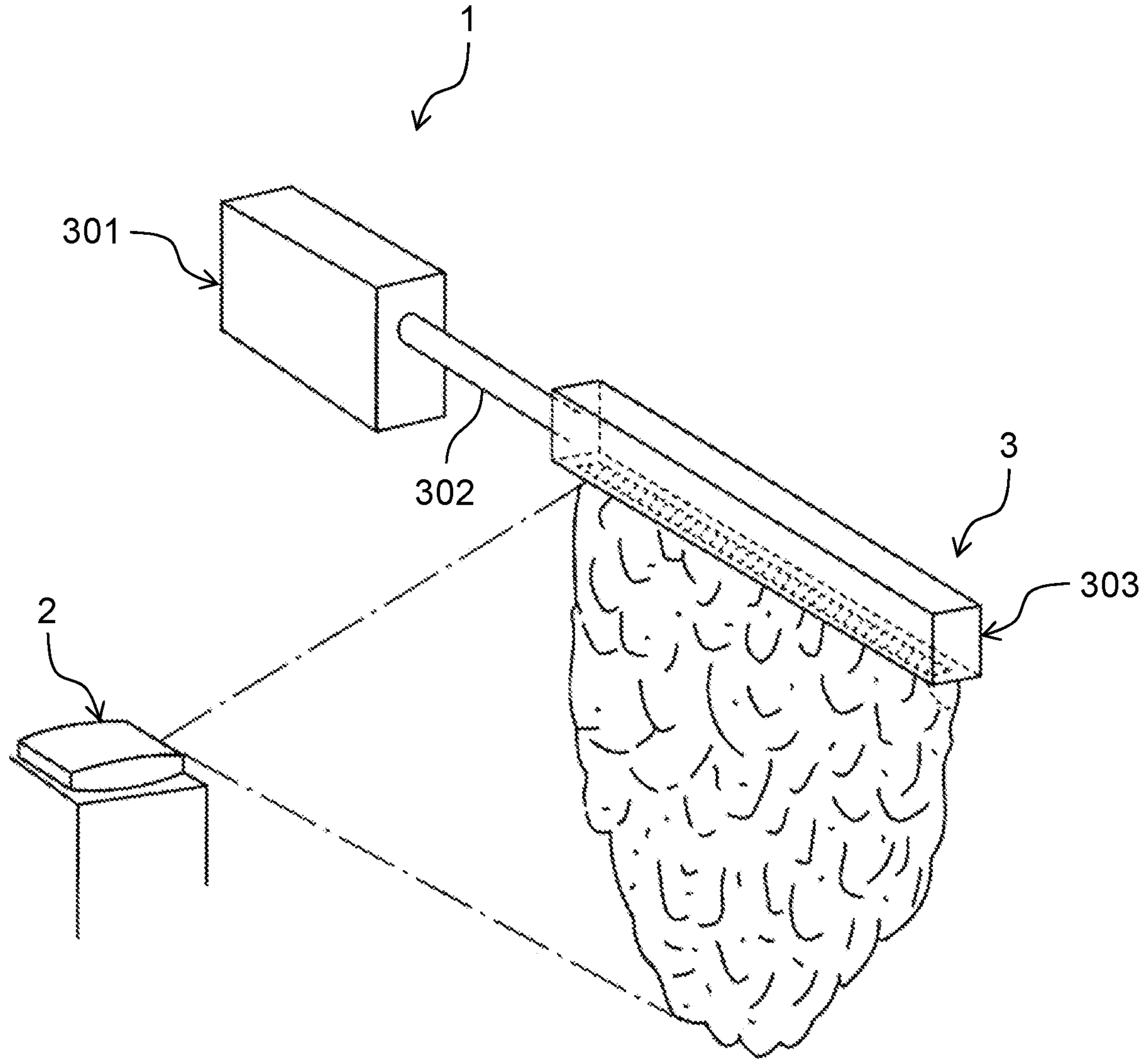
FIG. 8 is a perspective view illustrating an overall configuration of a conventional projection device.
Figure 9:
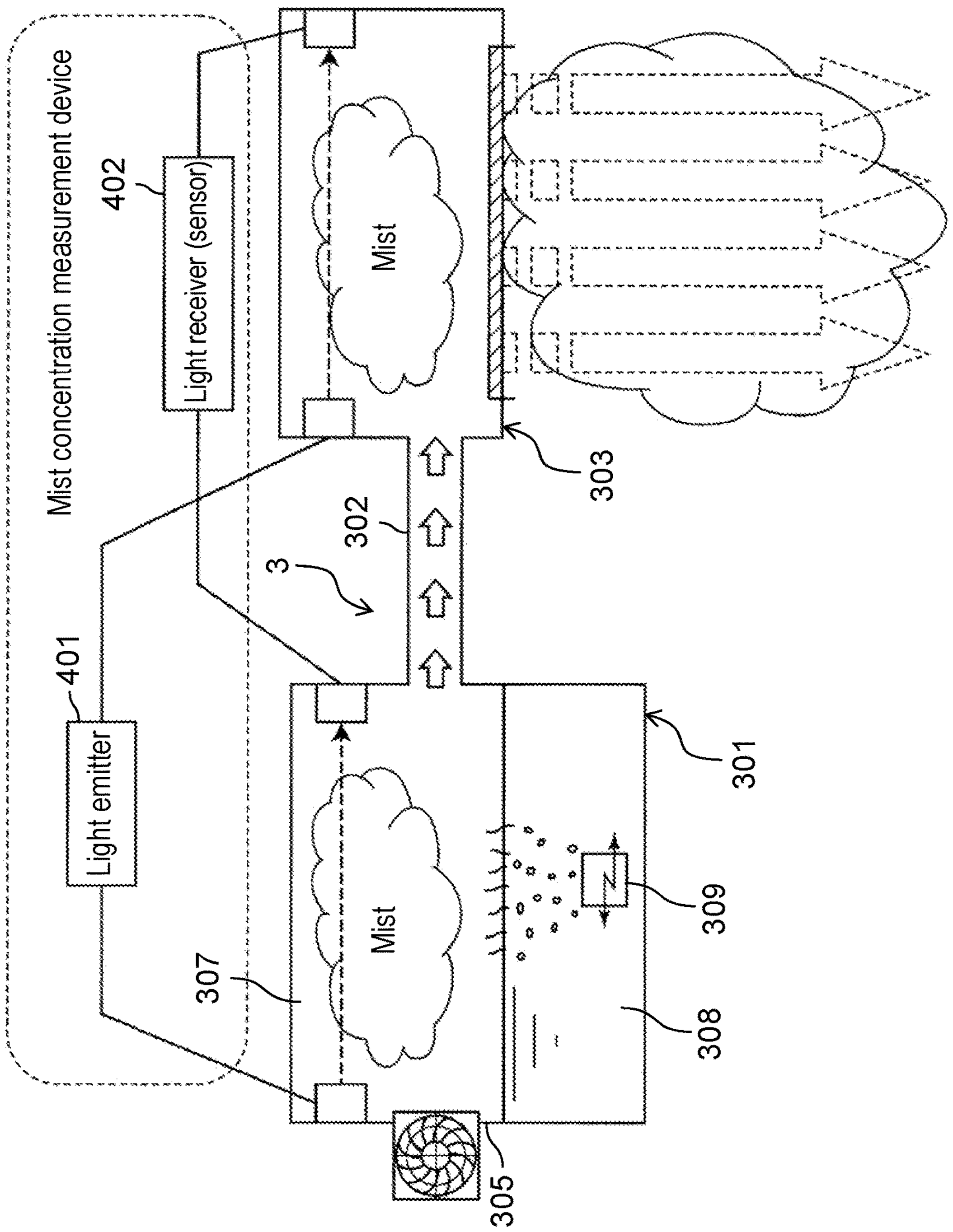
FIG. 9 is a schematical cross-sectional view of a conventional mist screen forming device.

FIG. 7 is a configuration diagram of spray device D according to a ninth embodiment of the present disclosure.

Spray device D according to the present embodiment is different from spray device B according to the seventh embodiment in that liquid valve 16, gas pressure gauge 200, liquid pressure gauge 201, pressure reducing valve 202 and controller 30A are not included and check valve 203 is included in spray device B according to the variation of the seventh embodiment described in the seventh embodiment. In the following, with respect to spray device D according to the present embodiment, description of the matters which have been described in the seventh embodiment will be omitted as appropriate, and the differences from spray device B according to the seventh embodiment will be mainly described. The structural elements included in spray device D according to the present embodiment that are substantially the same as the structural elements included in spray device B described in the seventh embodiment are assigned the same reference signs, and the description thereof will be omitted or simplified.

Spray device D includes check valve 203 which is provided in spray-device-side liquid flow path 13 between liquid flow control valve 14 and two-fluid nozzle 11 to allow the liquid to flow from the liquid flow control valve 14 side to the two-fluid nozzle 11 side, and prevents the liquid from flowing in the reverse direction.

When the pressure of the gas discharged from gas supply source 17 is greater than or equal to the allowable pressure of liquid flow control valve 14 and the pressure difference between the pressure of the gas discharged from gas supply source 17 and the pressure of the liquid discharged from liquid supply source 18 is less than the allowable pressure difference, by causing check valve 203 to prevent the flow from the two-fluid nozzle 11 side to the liquid flow control valve 14 side, the pressure of the gas discharged from gas supply source 17 is not applied to the gas supply source 17 side of liquid flow control valve 14. In other words, even when the gas pressure is greater than the allowable pressure, check valve 203 does not cause a back pressure to liquid flow control valve 14. Hence, liquid supply source 18 provides no supply, and liquid flow control valve 14 is protected even when gas is supplied from gas supply source 17. As a result, it is possible to further reduce the occurrence of malfunctions of liquid flow control valve 14.

Application of check valve 203 to the seventh and eighth embodiments provides the same advantageous effects as those of the ninth embodiment.

In the above embodiments or variations, when liquid valve 16 and pressure reducing valve 202 are included, liquid valve 16 and pressure reducing valve 202 may be arranged in any order. In the above described embodiments or variations, liquid pressure gauge 201 may be arranged downstream of pressure reducing valve 202.

In each of the above described embodiments, operation information of console 40 may also be added when controller 30, 30A, or 30B adjusts the mist concentration in multiple levels in accordance with the intensity of the output of another staging device to be combined with the mist.

According to each of the above-described embodiments, controller 30, 30A or 30B adjusts the valve opening degree of liquid flow control valve 14 to spray mist, which is atomized liquid, into indoor space 90 with two-fluid nozzles 11, so that the mist concentration in indoor space 90 can be adjusted in multiple levels. As a result, the mist concentration can be adjusted in multiple levels by the control of controller 30, 30A or 30B performed in accordance with the output, such as the intensity of sound or light flux from another staging device 100 to be combined with the mist. For example, it is possible to meet a new demand for adjusting the mist concentration in multiple levels for the various staging forms of artists, although it had not been recognized as an object to be achieved.

It should be noted that, by appropriately combining any of the various embodiments or variations described above, the advantageous effects described above can also be provided. In addition, any combination of embodiments, examples, or features in different embodiments described above is possible.

INDUSTRIAL APPLICABILITY

A spray device, a spray method, and a mist space staging system according to the above described aspects of the present disclosure are capable of spraying mist, which is atomized liquid, into an indoor space with two-fluid nozzles, and adjusting the mist concentration in the indoor space in multiple levels. As a result, the mist concentration can be adjusted in accordance with the output from another staging device to be combined with the mist, for example, the intensity of sound or light flux, and the mist space can be staged in various forms. Hence, the spray device, the spray method, and the mist space staging system are usable in applications such as art or entertainment.

REFERENCE MARKS IN THE DRAWINGS

- 1 projection device
- 2 projection unit
- 3 screen forming device
- 11 two-fluid nozzle
- 12 spray-device-side gas flow path
- 13 spray-device-side liquid flow path
- 14 liquid flow control valve
- 15 gas valve
- 16 liquid valve
- 17 gas supply source
- 18 liquid supply source
- 30, 30A, 30B controller
- 31 control wiring
- 32 signal wiring
- 33 external signal input terminal
- 40 console
- 90 indoor space
- 91 mist
- 99 flow meter
- 100 staging device
- 101 mist space staging system
- 102 video projection device
- 103 audio device
- 104 odor generation device
- 105 odor elimination device
- 106 air blower
- 107 air conditioning device

120 two-fluid nozzle main body
121 nozzle-side liquid flow path
122 nozzle-side gas flow path
123 hollow cylindrical portion
124 central axis
130 liquid inlet portion
131 liquid inflow port
132 protrusion
133 gap
140 gas inlet portion
141 gas inflow port
150 gas-liquid ejection portion
151 tubular flow path
152 ejection port
153 flow path
154 rectifying portion
155 rectified flow outlet
156 inscribed circle
157 circumscribed circle
160 gas-liquid mixing portion
170 gas-liquid ejection portion fixing portion
200 gas pressure gauge
201 liquid pressure gauge
202 pressure reducing valve
203 check valve
301 generator
302 duct
303 ejection portion
305 opening
307 tank
308 water
309 ultrasonic transducer
401 light emitter
402 light receiver
A, B, C, D spray device

The invention claimed is:

1. A spray device comprising:

a two-fluid nozzle which sprays a mist obtained by mixing a liquid and a gas and atomizing the liquid;

a spray-device-side gas flow path for supplying the gas to the two-fluid nozzle;

a gas supply source which supplies the gas to the spray-device-side gas flow path;

a spray-device-side liquid flow path for supplying the liquid to the two-fluid nozzle;

a liquid supply source which supplies the liquid to the spray-device-side liquid flow path;

a liquid flow control valve which is provided in the spray-device-side liquid flow path between the two-fluid nozzle and the liquid supply source, the liquid flow control valve being driven by a pulse and having a valve opening degree that is adjusted according to a pulse signal to control a flow rate of the liquid in the spray-device-side liquid flow path;

a gas pressure gauge which is provided in the spray-device-side gas flow path between the two-fluid nozzle and the gas supply source to detect a pressure of the gas in the spray-device-side gas flow path;

a liquid pressure gauge which is provided in the spray-device-side liquid flow path between the liquid flow control valve and the liquid supply source to detect a pressure of the liquid in the spray-device-side liquid flow path; and a separately-provided on-off solenoid valve which is provided in the spray-device-side liquid flow path between the liquid flow control valve and the liquid pressure gauge to open and close the spray-device-side liquid flow path; and a controller, when the pressure of the liquid detected by the liquid pressure gauge is greater than the pressure of the gas detected by the gas pressure gauge and a pressure difference between the pressure of the liquid and the pressure of the gas is greater than or equal to an allowable pressure difference preset to the liquid flow control valve, closes the on-off solenoid valve, and when the pressure difference is less than the allowable pressure difference, the controller opens the on-off solenoid valve.

2. The spray device according to claim 1, wherein, when a received pulse signal, which is a pulse signal received by the controller, changes from an increasing state to a decreasing state, the controller corrects a pulse for driving the liquid flow control valve to be less than the received pulse signal, and when the received pulse signal changes from the decreasing state to the increasing state, the controller corrects the pulse to be greater than the received pulse signal.

3. The spray device according to claim 1, further comprising:

a flow meter which is provided in the spray-device-side liquid flow path to detect the flow rate of the liquid flowing through the spray-device-side liquid flow path, wherein the controller adjusts the valve opening degree of the liquid flow control valve in accordance with the flow rate detected by the flow meter.

4. The spray device according to claim 1, further comprising:

a pressure reducing valve provided in the spray-device-side liquid flow path between the liquid pressure gauge and the liquid supply source to reduce the pressure of the liquid discharged from the liquid supply source, wherein the pressure reducing valve reduces the pressure of the liquid such that the pressure difference between the pressure of the gas detected by the gas pressure gauge and the pressure of the liquid detected by the liquid pressure gauge is less than the allowable pressure difference.

5. The spray device according to claim 1, further comprising:

a check valve which is provided in the spray-device-side liquid flow path between the liquid flow control valve and the two-fluid nozzle to allow the liquid to flow from a liquid flow control valve side to a two-fluid nozzle side and to prevent the liquid from flowing from the two-fluid nozzle side to the liquid flow control valve side.

6. A mist space staging system comprising:

a spray device which includes a two-fluid nozzle which sprays a mist obtained by mixing a liquid and a gas and atomizing the liquid, a spray-device-side gas flow path for supplying the gas to the two-fluid nozzle, a gas valve which opens or closes the spray-device-side gas flow path, a gas supply source which supplies the gas to the spray-device-side gas flow path, a spray-device-side liquid flow path which supplies the liquid to the two-fluid nozzle, a separately-provided solenoid liquid valve which opens or closes the spray-device-side liquid flow path, a liquid supply source that supplies the liquid to the spray-device-side liquid flow path, a liquid flow control valve which is provided in the spray-device-side liquid flow path between the two-fluid nozzle and the solenoid liquid valve to adjust a valve opening degree by a pulse signal, and controls a flow rate of the liquid in the spray-device-side liquid flow path, and a controller that controls the valve opening degree of the liquid flow control valve in multiple levels by the pulse signal from a console outside the spray device, the controller controls the valve opening degree of the liquid flow control valve in multiple levels to adjust the spray flow rate of the mist sprayed from the two-fluid nozzle in multiple levels and adjust the mist concentration in multiple levels, the controller performing control such that a pulse for driving the liquid flow control valve is corrected to be smaller than the received pulse signal in a case where the pulse signal received from the console changes from an increasing state to a decreasing state and the pulse for driving the liquid flow control valve is corrected to be larger than the received pulse signal in a case where the pulse signal received from the console changes from the decreasing state to the increasing state; and a staging device, wherein the controller adjusts the concentration of the mist in multiple levels in accordance with an output from the staging device.

7. The mist space staging system according to claim 6, wherein the staging device includes at least one of a lighting device or a video projection device, and the controller adjusts the concentration of the mist in accordance with an intensity of a light flux from the at least one of the lighting device or the video projection device.

8. The mist space staging system according to claim 6, wherein the staging device includes an audio device, and the controller adjusts the concentration of the mist in accordance with an intensity of a sound output from the audio device.

9. The mist space staging system according to claim 6, wherein the staging device includes at least one of an odor generation device or an odor elimination device, and the controller adjusts the concentration of the mist in accordance with an intensity of at least one of an odor generated by the odor generation device or an odor remaining in a space after an odor elimination performed by the odor elimination device.

10. The mist space staging system according to 6, wherein the staging device includes at least one of an air blower or an air conditioning device, and the controller adjusts the concentration of the mist in accordance with an intensity of wind from the at least one of the air blower or the air conditioning device.

11. A spray method using the spray device according to claim 2, the spray method comprising:

supplying a gas from a gas supply source to a two-fluid nozzle via a spray-device-side gas flow path which is opened and closed by a gas valve;

supplying a liquid from a liquid supply source to the two-fluid nozzle via a spray-device-side liquid flow path which is opened and closed by a liquid valve;

spraying, from the two-fluid nozzle, a mist obtained by mixing the liquid and the gas supplied to the two-fluid nozzle and atomizing the liquid;

receiving, by a controller, a pulse signal when the mist is sprayed from the two-fluid nozzle; and adjusting, in multiple levels, a concentration of the mist sprayed from the two-fluid nozzle by adjusting, by the controller, a valve opening degree control pulse of a liquid flow control valve to control a flow rate of the liquid in the spray-device-side liquid flow path, the liquid flow control valve being provided in the spray-device-side liquid flow path between the two-fluid nozzle and the liquid valve and being driven by a pulse.

12. A spray method using the spray device according to claim 1, the spray method comprising:

supplying a gas from a gas supply source to a two-fluid nozzle via a spray-device-side gas flow path;

supplying a liquid from a liquid supply source to the two-fluid nozzle via a spray-device-side liquid flow path and a liquid flow control valve which is provided in the spray-device-side liquid flow path and is driven by a pulse;

spraying, from the two-fluid nozzle, a mist obtained by mixing the liquid and the gas supplied to the two-fluid nozzle and atomizing the liquid; and when the mist is sprayed from the two-fluid nozzle, (i) closing an on-off valve when a pressure of the liquid detected by a liquid pressure gauge is greater than a pressure of the gas detected by a gas pressure gauge and a pressure difference between the pressure of the liquid and the pressure of the gas is greater than or equal to an allowable pressure difference preset to the liquid flow control valve, and (ii) opening the on-off valve when the pressure difference is less than the allowable pressure difference, the on-off valve being provided in the spray-device-side liquid flow path between the liquid flow control valve and the liquid pressure gauge, the liquid pressure gauge being provided in the spray-device-side liquid flow path between the liquid flow control valve and the liquid supply source, the gas pressure gauge being provided in the spray-device-side gas flow path between the two-fluid nozzle and the gas supply source.

13. A spray method using the spray device according to claim 5, the spray method comprising:

supplying a gas from a gas supply source to a two-fluid nozzle via a spray-device-side gas flow path;

supplying a liquid from a liquid supply source to the two-fluid nozzle via a spray-device-side liquid flow path and a liquid flow control valve which is provided in the spray-device-side liquid flow path and which is driven by a pulse;

spraying, from the two-fluid nozzle, a mist obtained by mixing the liquid and the gas supplied to the two-fluid nozzle and atomizing the liquid; and when the mist is sprayed from the two-fluid nozzle, causing a check valve (i) to allow the liquid to flow from a liquid flow control valve side to a two-fluid nozzle side and (ii) to prevent the liquid from flowing from the two-fluid nozzle side to the liquid flow control valve side, the check valve being provided in the spray-device-side liquid flow path between the liquid flow control valve and the two-fluid nozzle.

* * * * *